US008300698B2

(12) United States Patent
Reznik

(10) Patent No.: US 8,300,698 B2
(45) Date of Patent: Oct. 30, 2012

(54) SIGNALLING OF MAXIMUM DYNAMIC RANGE OF INVERSE DISCRETE COSINE TRANSFORM

(75) Inventor: Yuriy Reznik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1132 days.

(21) Appl. No.: 11/865,915

(22) Filed: Oct. 2, 2007

(65) Prior Publication Data

US 2008/0095245 A1    Apr. 24, 2008

Related U.S. Application Data

(60) Provisional application No. 60/862,591, filed on Oct. 23, 2006.

(51) Int. Cl.
*H04N 11/02* (2006.01)
(52) U.S. Cl. ............ 375/240.2; 375/240.02; 375/240.05
(58) Field of Classification Search ............... 375/240.2, 375/240.02, 240.05
See application file for complete search history.

(56) References Cited

U.S. PATENT DOCUMENTS

| | | | |
|---|---|---|---|
| 5,129,015 A | 7/1992 | Allen et al. | |
| 5,285,402 A | 2/1994 | Keith | |
| 5,642,438 A | 6/1997 | Babkin | |
| 5,754,456 A | 5/1998 | Eitan et al. | |
| 5,974,185 A * | 10/1999 | Boyce et al. | ................. 382/239 |
| 6,009,207 A | 12/1999 | Chen | |
| 6,020,838 A | 2/2000 | Knudsen et al. | |
| 6,026,183 A | 2/2000 | Talluri et al. | |
| 6,167,092 A * | 12/2000 | Lengwehasatit | ........... 375/240.2 |
| 6,292,817 B1 | 9/2001 | Matsui | |
| 6,539,058 B1 | 3/2003 | Pearlstein et al. | |
| 6,694,342 B1 | 2/2004 | Mou | |
| 6,704,358 B1 * | 3/2004 | Li et al. | .................... 375/240.02 |
| 6,735,609 B2 | 5/2004 | Dixit et al. | |
| 6,909,753 B2 * | 6/2005 | Meehan et al. | .......... 375/240.27 |
| 7,054,493 B2 | 5/2006 | Schwartz | |

(Continued)

FOREIGN PATENT DOCUMENTS

CN    1653822 A    8/2005

(Continued)

OTHER PUBLICATIONS

Y.Arai, T. Agui, and M. Nakajima, "A Fact DCT-SQ Scheme for Images", Transactions of the IEICE E 71(11): 1095, Nov. 1988.

(Continued)

*Primary Examiner* — Jason Mattis
(74) *Attorney, Agent, or Firm* — Brent A. Boyd

(57) ABSTRACT

Techniques are described to signal a maximum dynamic range of inverse discrete cosine transform ("IDCT") output values that may be produced when a set of encoded media data is decoded. In accordance with these techniques, an encoding device may generate a media file that includes encoded media data associated with a set of one or more video frames. The media file may also include a range indication element that indicates the maximum dynamic range of IDCT output values produced when the encoded media data is decoded. A decoding device that receives the media file may, prior to decoding the encoded media data, use the range indication element to determine whether to decode the encoded media data. For instance, the decoding device may not decode the encoded media data when the decoding device is not capable of producing IDCT output values in the indicated range of IDCT output values.

25 Claims, 7 Drawing Sheets

U.S. PATENT DOCUMENTS

| | | | |
|---|---|---|---|
| 2001/0026642 A1* | 10/2001 | Kang et al. | 382/248 |
| 2002/0090028 A1* | 7/2002 | Comer et al. | 375/240.2 |
| 2002/0090029 A1* | 7/2002 | Kim | 375/240.03 |
| 2002/0154693 A1 | 10/2002 | Demos et al. | |
| 2003/0177158 A1 | 9/2003 | Zheltov et al. | |
| 2004/0010528 A1 | 1/2004 | Kumar et al. | |
| 2004/0091157 A1 | 5/2004 | Kang | |
| 2004/0117418 A1 | 6/2004 | Vainsencher et al. | |
| 2005/0004962 A1 | 1/2005 | Ju | |
| 2005/0033788 A1 | 2/2005 | Handley | |
| 2005/0050128 A1 | 3/2005 | Ju | |
| 2005/0196055 A1* | 9/2005 | Zhong et al. | 382/233 |
| 2007/0003153 A1* | 1/2007 | Miller-Smith | 382/250 |
| 2007/0297502 A1 | 12/2007 | Reznik | |
| 2007/0297503 A1 | 12/2007 | Reznik | |
| 2007/0297504 A1 | 12/2007 | Reznik et al. | |
| 2007/0299897 A1 | 12/2007 | Reznik | |

FOREIGN PATENT DOCUMENTS

| | | |
|---|---|---|
| EP | 0955608 | 11/1999 |
| EP | 0990992 | 4/2000 |
| GB | 2304946 A | 3/1997 |
| JP | 2002537736 A | 11/2002 |
| JP | 2002374531 A | 12/2002 |
| JP | 2005157832 | 6/2005 |
| KR | 1019990087552 | 12/1999 |
| KR | 1020000013653 | 3/2000 |
| KR | 1020030045028 | 6/2003 |
| KR | 1020060135613 | 12/2006 |
| RU | 2119727 | 9/1998 |
| RU | 2122295 | 11/1998 |
| RU | 2128405 | 3/1999 |
| RU | 2196391 | 1/2003 |
| TW | 395135 | 6/2000 |
| TW | 224931 | 12/2004 |
| WO | WO9210925 | 6/1992 |
| WO | WO9421083 A1 | 9/1994 |
| WO | WO9733236 | 9/1997 |
| WO | WO9834406 A1 | 8/1998 |
| WO | WO9939303 | 8/1999 |
| WO | WO0049810 A1 | 8/2000 |
| WO | WO0251160 | 6/2002 |
| WO | WO2008002881 | 1/2008 |

OTHER PUBLICATIONS

Loeffler, et al.: "Practical fast 1-D DCT algorithms with 11 multiplications," 1989 International Conference on Acoustics, Speech, and Signal Processing, 1989 vol. 2, pp. 988-991, May 1989.

M. Vetterli and A. Ligtenberg, "A Discrete Fourier-Cosine Transform Chip," IEEE Journal on Selected Areas in Communications,vol. SAC-4, No. 1, Jan. 1986 pp. 49-61.

ISO/IEC JTC1/SC29/WG11N7292 [11172-6 Study on FCD] Information Technology—Coding of Moving Pictures and Associated Audio for Digital Storage Media at up to About 1.5 Mbit/s—Part 6: Specification of Accuracy Requirements for Implementation of integer inverse Discrete Cosine Transform, IEEE standard 1180-1190, pp. 1-14, Approved Dec. 6, 1990.

ISO/IEC JTC1/SC29/WG11 N7335 "Call for Proposals on Fixed-Point 8×8 IDCT and DCT Standard," pp. 1-18. Poznan, Poland, Jul. 2005.

ISO/IEC JTC 1/SC 29/WG11 N7815 [23002-1 FDIS ] "Information technology—MPEG video technologies:—Part 1; Accuracy requirements for implementation of interger-output 8×8 inverse discrete cosine transform," pp. 1-18, Jan. 20, 2006.

ISO/IEC JTC1/SC29/WG11 N7817 [23002-2 WD1] "Information technology—MPEG Video Technologies—Part 2: Fixed-point 8×8 IDCT and DCT transforms," pp. 1-27, Jan. 19, 2006.

ISO/IEC 11172:1992 "Information Technology—Coding of moving pictures and associated audio for digital storage media at up to about 1.5 Mbit/s—Part 2—Video," pp. 1-222, Aug. 1, 1993.

ISO/IEC 14496-2-2001 "Information technology—Coding of audio-visual objects—Part 2: Visual." Jul. 2001. PART1, pp. 1-249.

ISO/IEC 14496-2:2001 "Information technology—Coding of audio-visual objects—Part2: Visual," Jul. 2001, PART2, pp. 1-99.

ITU-T Recommendation H.263: "Series H: Audiovisual and multimedia systems—Infrastructure of Audiovisual services—coding of moving video—Video Coding for Low Bit Rate Communication," Jan. 2005, pp. 1-226.

M12936: C-X Zhang and L.Yu, "Low complexity and High Fidelity Fixed-Point Multiplier-less DCT/IDCT Implementation Scheme," ISO/IEC JTC1/SC29/WG11 MPEG 2006/M12936, Jan. 2006, Bangkok, Thailand, pp. 1-10.

M13001: Yurly A. Reznik and Arianne T. Hinds, "Improved Proposal for MPEG Fixed-Point 8×8 IDCT Standard," ISO/IEC JTC1/SC29/WG11 MPEG2006/M13001, Jan. 2006, Bangkok, Thailand, pp. 1-22.

M13256: C-X Zhang and L. Yu, "Improved Fixed-Point DCT/IDCT Implementation Scheme with Low Complexity and High Fidelity," ISO/IEC JTC1/SC29/WG11 MPEG2006/M13256, Apr. 2006, Montreux, Switzerland, pp. 1-6.

M13299: Trac D. Tran, Lijie Liu, Pankaj Topiwala, "Improved High-Accuracy Multiptlerless DCT/IDCT Based on the Lifting Scheme," ISO/IEC JTC1/SC29/WG11 MPEG2006/M13299, Apr. 2006, Montreux, Switzerland, pp. 1-5.

M13326; Yuriy A. Reznik and Arianne T. Hinds, "Proposed Experiement on Exploration on Convergence of Scaled and Non-Scaled IDCT Designs." ISO/IEC JTC1/SC29/WG11 MPEG2006/M13326, Apr. 2006, Montreux, Switzerland pp. 1-9.

M13375: Michael A. Isnardi, "Description of Sample Bitstream for Testing IDCT Linearity" ISO/IEC JTC1/SC29/WG11 MPEG2006/M13375, Apr. 2006, Montreux, Switzerland, pp. 1-8.

MPEG-2 TM5 Encoder/Decoder, Version 1.2, Jul. 19, 1996, MPEG Software Simulation Group, Retrieved from http://www.mpeglorg/MPEG/MSSG/Codec/readme.txt.

"Information Technology—MPEG Video Technologies—Part 1: Accuracy Requirements for Implementation of Integer-Output 8×8 Inverse Discrete Cosine Transform," International Organisation for Standardisation, ISO/IEC JTC1 SC29/WG11 Coding of Moving Pictures and Audio, No. N7815, Jan. 20, 2006, XP030014307.

"IEEE. Standard Specifications for the Implementations of 8 ×8 Inverse Discrete Cosine Transform," IEEE Std 1180-1990, Mar. 18, 1991, pp. 7-13, XP000563262.

Arianne T. Hinds et al., "On IDCT Exactness, Precision, and Drift Problem," International Organisation for Standarisation ISO/IEC JTC1 SC29/WG11 Coding of Moving Pictures and Audio, No. M13657, Jul. 17, 2006, XP030042326.

International Search Report, PCT/US07/082291, International Search Authority, European Patent Office, May 2, 2008.

Written Opinion, PCT/US07/082291, International Search Authority, European Patent Office, May 2, 2008.

Hinds, A: "m14531.zip," Screenshots of Content of Compressed File M14531.ZIP, (Apr. 21, 2007), XP002610524.

Hinds, Arianne T.: "Fixed-Point IDCT Conformance Tests," ISO/IEC JTC1/SC29/WG11, MPEG2007/M14531, IBM, San Jose, USA, (Apr. 21, 2007), XP030043168.

Reznik, Y. et al.: "idct-z0a.c," C Code Submitted With Contribution Document m14531, (Apr. 21, 2007), XP002610523.

Reznik, Yuriy: "m14506.zip," Screenshot of Content of Compressed File M14506.ZIP, (Apr. 19, 2007), XP002610525.

Reznik, Yuriy: "Summary of Core Experiments on fixed point IDCT/DCT, "ISO/IEC JTC1/SC29/WG11, MPEG2006/14506, San Jose, USA, (Apr. 19, 2007), XP030043143.

Video Subgroup: "23002-2-FCD-software.c," C Code Submitted With Output Document N8983, (May 19, 2007), XP002610521.

Video Subgroup: Text of ISO/IEC FCD 23002-2: Information technology—MPEG.

Video technologies—Part 2: Fixed-point 8×8 IDCT and DCT, ISO/IEC JTC 1/SC 29/WG11, Apr. 27, 2007, San Jose, USA, retrieved May 19, 2007, XP030015477.

Video Subgroup: "w8983.zip", Screenshot of Content of Compressed File W8983.ZIP, (May 19, 2007), XP002610522.

Zhou M. and De Lameillieure J., "IDCT output range in MPEG video coding", Signal Processing: Image Communication, vol. 11, No. 2, pp. 137-145, Dec. 1997.

Y. Reznik, "On clipping and dynamic range of variables in IDCT designs", ISO/IEC1/JTC1/SC29 WG11 input document MPEG2006/M14004, Oct. 2006, Hangzhou, China.

Bivolarksi L: "Low complexity 1D IDCT for 16-bit parallel architectures" Applications of Digital Signal Processing XXX, Proceedings of SPIE, vol. 6696, Sep. 24, 2007, pp. 669619-1-669619-8, XP002605975.

Bivolarski L, et al., "On implementation of IDCTs on existing 16-bit architectures" ISO/IEC JTC1/SC29/WG11 M13993, Oct. 2006, Hangzhou, China, Oct. 23, 2006, XP030042661.

Bivolarski L et al: "m13993.zip" Screenshot of Content of Compressed File M13993. ZIP, Oct. 23, 2006, XP002605952.

Bivolarski L: "16-bit fixed-point 8×8 IDCT implementation" ISO/IEC JTC1/SC29/WG11 M13500, Jul. 2006, Klagenfurt, Austria, Jul. 12, 2006, XP030042169.

Bivolarski L; "IDCT 16.C..txt" Code Submitted with Contribution Document M13500, Jul. 12, 2006, XP002605950.

Bivolarski L: "m13500.zip" Screenshot of Content of Compressed File M13500.ZIP, Jul. 12, 2006, XP002605951.

Ci-Xun Zhang, et al., "Extended Results for Fixed-Point 8×8 DCT/IDCT Design and Implementation" ISO / IEC JTC1/SC29/WG11 M12935, Jan. 2006, Bangkok, Thailand, No. M12935, Jan. 19, 2006, XP030041604.

Ci-Xun Zhang, et al., "Systematic approach of fixed point 8×8 IDCT and DCT design and implementation" Picture Coding Symposium 2006, Apr. 24-26, 2006, Beijing, China, Apr. 24, 2006, XP030080252.

Ci-Xun Zhang et al:"m12935-idct-high-accuracy. C "Code Submitted With Contribution Document M12935, Jan. 19, 2006, XP002605954.

Ci-Xun Zhang: "m12935.zip" Screenshot of Content of Compressed File M12935.Zip, Jan. 19, 2006, XP002605955.

Gregor Rozinaj, et al., "Approximation of DCT without multiplication in JPEG"; Oct. 1996, IEEE ICECS '96 Proceeding, 704-707.

Hassan El-Banna et al.; An efficient implementation of the 1D DCT using FPGA technology. ; Dec. 2003, Microelectronics Proceedings of the 15th International Conference, 278-281.

International Search Report and Written Opinion—PCT/US2007/072039, International Search Authority—European Patent Office—Nov. 19, 2010.

International Search Report and Written Opinion—PCT/US2007/072088, International Search Authority—European Patent Office—Nov. 19, 2010.

International Search Report and Written Opinion—PCT/US2007/072162, International Search Authority—European Patent Office—Nov. 19, 2010.

James D. Allen et al.; The multiply-free chen transform—a rational approach to JPEG; 1991, Picture Coding Symposium PCS 91; 8.6-1 to 8.6-4.

Jan Richardson, Video Encoding H.264 and MPEG-4—Standards of New Generation, Moscow, Technosfera, 2005, pp. 70-85 .

Lampert, Christoph, et al., XVID open source implementation of MPEG-4 ASP; Apr. 3, 2005 <http://downloads.xvid.org/downloads/xvidcore-1.1.0.tar.gz>.

Lee, Ying-Pin et al. "A Cost Effective Architecture for 8×8 two-Dimensional DCT/IDCT Using Direct Method", IEEE Transactions on Circuits and Systems for Video Technology, vol. 7, No. 3, pp. 459-467, Jun. 1997.

Li, W.; "A New Algorithm to Compute the DCT and its Inverse"; Jun. 1991, IEEE Transactions on Signal Processing, 1305-1313.

Rao, et al.: "Discrete cosine transform: algorithms, advantages, applications," Academic Press Professional, Inc., San Diego, CA, pp. 490, ISBN: 0-12-580203-X, 1990, CH. 3-4.

Reznik Y. A., et al., "Efficient fixed-point approximations of the 8×8 inverse dicrete cosine transform ,Proceedings of SPIE," Applications of Digital Image Processing XXX, 2007, 6696, 669617-1-669671-17.

Reznik Y, et al., "Additional information on IDCT CD candidates and proposed core experiments" ISO/IEC JTC1/SC29/WG11 M14005, Oct. 2006, Hangzhou, China, Oct. 25, 2006, XP030042673.

Reznik Y, et al., "Response to CE on convergence of scaled and non-scaled IDCT architectures" ISO/IEC JTC1/SC29/WG11 M13650, Jul. 2006, Klagenfurt, Austria, Jul. 13, 2006, XP030042319.

Reznik Y et al: "idct Z1.c" C Code Submitted With Contribution Document M13650, Jul. 13, 2006, pp. 4, XP002605956.

Reznik Y et al: "idct L1.c" C Code Submitted With Contribution Document M14168, Jan. 18, 2007, XP002606534.

Reznik Y et al: "m13650.zip" Screenshot of Content of Compressed File M13650.ZIP, Jul. 13, 2006, XP002605957.

Reznik Y et al: "m14005.zip" Screenshot of Content of Compressed File M14005.ZIP, Oct. 25, 2006, XP002605953.

Reznik Y: "m14167.zip" Screenshot of Content of Compressed File M14167.ZIP, Jan. 10, 2007, XP002606533.

Reznik Y: "Summary of core experiments on fixed-point IDCT/DCT" ISO/IEC JTC1/SC29/WG11 M14167, January 2007, Marrakech, Marocco, Jan. 10, 2007, XP030042823.

Seehyun Kim, et al., "Fixed-point error analysis and wordlength optimization of a distributed arithmetics based 8×8 2D-IDCT architecture"; 1996, Workshop on VLSI signal processing IX; 398-407.

Sullivan G. L., "Standardization of IDCT approximation behavior for video compression: the history and the new MPEG-C parts 1 and 2 standards," Applications of Digital Image Processing, Proceedings of SPIE, 2007, 6696, 669611-1 to 669611-22.

Taiwanese Search report—096123080—TIPO—Jul. 15, 2010.

Testform.zip file, sent on IDCT reflector [mpeg-vidct@lists.rwth-aachen.de] by Lijie Liu, 2005.

Trac D Tran, et al., "FastVDO 16-bis IDCT proposal for CD" ISO/IEC JTCl/SC29/WG11 M13847, Sep. 2006, Hangzhou, China, Sep. 17, 2006, pp. 2, XP030042515.

Trac D Tran et al: "m13847.zip" Screenshot of Content of Compressed File M13847 .ZIP, Oct. 17, 2006, XP002605960.

Vassil Dimitrov, et al., "Multiplierless DCT algorithm for image compression applications"; vol. 11, No. 2, 2004, International Journal Information Theories & Applications, 162-169.

Video Subgroup: ISO-IEC-23002-2 (WD2). doc Working Draft Submitted With Output Document N8255, Jul. 21, 2006, pp. 1-19, XP002605958.

Video Subgroup: "w8255.zip" Screenshot of Content of Compressed File W8255.ZIP, Jul. 21, 2006, XP002605959.

Video Subgroup: "Working Draft 2.0 of ISO/IEC 23002-2 Fixed point IDCT and DCT" ISO/IEC JTC1/SC29/WG11 N8255, Jul. 2006, Klagenfurt, Austria, Jul. 21, 2006, XP030014747.

Zhibo Ni, et al., "Cross-check of IDCT core experiments" (ISO/IEC JTC1/SC29/WG11 M14168, Jan. 2007, Marrakech, Marocco, Jan. 18, 2007, XP030042824.

Zhibo Ni et al: "m14168.zip" Screenshot of Content of Compressed File M14168.ZIP, Jan. 18, 2007, XP002606535.

Aiyoshi E., "Handbook of Automatic Control", Ohmsha Ltd., Aug. 27, 1997, 1st ed., pp. 188-194.

* cited by examiner

SIGNALLING OF MAXIMUM DYNAMIC RANGE OF INVERSE DISCRETE COSINE TRANSFORM

This application claims the benefit of U.S. Provisional Application No. 60/862,591, filed Oct. 23, 2006, the entire content of which is hereby incorporated by reference.

TECHNICAL FIELD

This disclosure relates to computer graphics, and particularly to compression of graphics data.

BACKGROUND

Many existing image and video coding standards employ compression techniques in order to allow high-resolution images and video to be stored or transmitted as relatively compact files or data streams. Such coding standards include Joint Photographic Experts Group ("JPEG"), Moving Pictures Experts Group ("MPEG")-1, MPEG-2, MPEG-4 part 2, H.261, H.263, H.264/Advanced Video Coding ("H.264/AVC") and other image or video coding standards.

In accordance with many of these standards, video frames are compressed using "spatial" encoding. These frames may be original frames (i.e., i-frames) or may be residual frames generated by a temporal encoding process that uses motion compensation. During spatial encoding, frames are broken into equal sized blocks of pixels. For example, an uncompressed frame may be broken into a set of 8×8 blocks of pixels. For each block of pixels, pixel components are separated into matrixes of pixel component values. For example, each block of pixels may be divided into a matrix of Y pixel component values, a matrix of U pixel component values, and a matrix of V pixel component values. In this example, Y pixel component values indicate luminance values and U and V pixel component values represent chrominance values.

Furthermore, during spatial encoding, a forward discrete cosine transform ("FDCT") is applied to each matrix of pixel component values in a frame that is being encoded. An ideal one-dimensional FDCT is defined by:

$$t(k) = c(k) \sum_{n=0}^{N-1} s(n) \cos \frac{\pi(2n+1)k)}{2N}$$

where s is the array of N original values, t is the array of N transformed values, and the coefficients c are given by:

$$c(0) = \sqrt{1/N}, c(k) = \sqrt{2/N}$$

for $1 \leq k \leq N-1$.

An ideal two-dimensional FDCT is defined by the formula:

$$t(i,j) = c(i,j) \sum_{n=1}^{N-1} \sum_{m=0}^{N-1} s(m,n) \cos \frac{\pi(2m+1)i}{2N} \cos \frac{\pi(2n+1)j}{2N}$$

where s is the array of N original values, t is the array of N transformed values, and c(i,j) is given by c(i,j)=c(i)c(j), and with c(k) defined as in the one-dimensional case.

A matrix of coefficients is produced when a block of pixel component values is transformed using the FDCT. This matrix of coefficients may then be quantized and encoded using, for example, Huffman or arithmetic codes. A video bitstream represents the combined result of performing this process on all blocks of pixel component values in video frames in an uncompressed series of video frames.

An uncompressed video frame may be derived from a video bitstream by reversing this process. In particular, each matrix of coefficients in the bitstream video is decompressed and the decompressed values are inverse quantized in order to derive matrixes of inverse quantized coefficients. An inverse discrete cosine transform ("IDCT") is then applied to each matrix of inverse quantized coefficients in order to derive matrixes of pixel component values. An ideal one-dimensional IDCT is defined by:

$$s(n) = \sum_{k=0}^{N-1} c(k) t(k) \cos \frac{\pi(2n+1)k}{2N}$$

where s is the array of N original values, t is the array of N transformed values, and the coefficients c are given by $$c(0) = \sqrt{1/N}, c(k) = \sqrt{2/N}$$

for $1 \leq k \leq N-1$.

An ideal two-dimensional IDCT is defined by the formula:

$$s(m,n) = \sum_{i=0}^{N-1} \sum_{j=0}^{N-1} c(i,j) t(i,j) \cos \frac{\pi(2m+1)i}{2N} \cos \frac{\pi(2n+1)j}{2N}$$

The resulting matrixes of pixel component values are then reassembled into blocks of pixels and these blocks of pixels are reassembled to form a decoded video frame. If the decoded video frame is an intra-coded frame, the video frame is now completely decoded. However, if the decoded video frame is an inter-coded frame, the decoded video frame is merely a decoded residual frame. A completed frame is generated by constructing a predicted frame using motion vectors associated with the decoded video frame and then adding the predicted frame to the decoded residual frame.

SUMMARY

Techniques are described to signal a maximum dynamic range of inverse discrete cosine transform ("IDCT") output values that may be produced when a set of encoded media data is decoded. In accordance with these techniques, an encoding device may generate a media file that includes encoded media data associated with a set of one or more video frames. The media file may also include a range indication element that indicates the maximum dynamic range of IDCT output values produced when the encoded media data is decoded. A decoding device that receives the media file may, prior to decoding the encoded media data, use the range indication element to determine whether to decode the encoded media data. For instance, the decoding device may not decode the encoded media data when the decoding device is not capable of producing IDCT output values in the indicated range of IDCT output values.

In one aspect, a method comprises receiving, with a decoding module, a media object that includes encoded media data that represents a set of one or more video frames and a range indication element that indicates a maximum dynamic range of IDCT output values associated with the encoded media data. The method also comprises determining whether the maximum dynamic range of IDCT output values associated with the encoded media data includes an IDCT output value that is outside a given range. Furthermore, the method comprises using a first operation to generate a set of IDCT output values based on the encoded media data when the maximum dynamic range of IDCT output values associated with the encoded media data does not include an IDCT output value that is outside the given range. In addition, the method comprises using the set of IDCT output values to generate reconstructed video frames associated with video frames in the set of video frames. The method also comprises causing a media presentation module to present the reconstructed video frames.

In another aspect, a method comprises receiving, from a decoding device, a message that indicates a maximum dynamic range of IDCT output values. In addition, the method comprises generating, in response to receiving the message, a first set of encoded media data that represents a set of one or more video frames, wherein IDCT output values associated with the first set of encoded media data do not include an IDCT output value that is outside the indicated range. The method also comprises outputting the first set of encoded media data to the decoding device.

In another aspect, a device comprises a communications interface that receives a media object that includes encoded media data that represents a set of one or more video frames and a range indication element that indicates a maximum dynamic range of IDCT output values associated with the encoded media data. The device also comprises a range checking module that determines whether the maximum dynamic range of IDCT output values associated with the encoded media data includes an IDCT output value that is outside a given range. In addition, the device comprises a first inverse transform module that uses a first operation to generate a set of IDCT output values based on the encoded media data when the maximum dynamic range of IDCT output values associated with the encoded media data does not include an IDCT output value that is outside the given range. The device also comprises a picture reconstruction module that uses the set of IDCT output values to generate reconstructed video frames associated with video frames in the set of video frames. Furthermore, the device comprises a presentation driver that causes a media presentation module to present the reconstructed video frames.

In another aspect, a device comprises a communications interface that receives, from a decoding device, a message that indicates a maximum dynamic range of IDCT output values. The device also comprises an encoding module that generates, in response to receiving the message, a first set of encoded media data that represents a set of one or more video frames, wherein IDCT output values associated with the first set of encoded media data do not include an IDCT output value that is outside the indicated range. The communications interface outputs the first set of encoded media data to the decoding device.

In another aspect, a device comprises means for receiving a media object that includes encoded media data that represents a set of one or more video frames and a range indication element that indicates a maximum dynamic range of IDCT output values associated with the encoded media data. The device also comprises means for determining whether the maximum dynamic range of IDCT output values associated with the encoded media data includes an IDCT output value that is outside a given range. In addition, the device comprises means for using a first operation to generate a set of IDCT output values based on the encoded media data when the maximum dynamic range of IDCT output values associated with the encoded media data does not include an IDCT output value that is outside the given range. Furthermore, the device comprises means for using the set of IDCT output values to generate reconstructed video frames associated with video frames in the set of video frames. The device also comprises means for causing a media presentation module to present the reconstructed video frames.

In another aspect, a device comprises means for receiving, from a decoding device, a message that indicates a maximum dynamic range of IDCT output values. The device also comprises means for generating, in response to receiving the message, a first set of encoded media data that represents a set of one or more video frames, wherein IDCT output values associated with the first set of encoded media data do not include an IDCT output value that is outside the indicated range. The device also comprises means for outputting the first set of encoded media data to the decoding device.

In another aspect, an integrated circuit comprises circuitry that receives a media object that includes encoded media data that represents a set of one or more video frames and a range indication element that indicates a maximum dynamic range of IDCT output values associated with the encoded media data. The integrated circuit also comprises circuitry that determines whether the maximum dynamic range of IDCT output values associated with the encoded media data includes an IDCT output value that is outside a given range. Furthermore, the integrated circuit comprises circuitry that uses a first operation to generate a set of IDCT output values based on the encoded media data when the maximum dynamic range of IDCT output values associated with the encoded media data does not include an IDCT output value that is outside the given range. In addition, the integrated circuit comprises circuitry that uses the set of IDCT output values to generate reconstructed video frames associated with video frames in the set of video frames. The integrated circuit also comprises circuitry that causes a media presentation module to present the reconstructed video frames.

In another aspect, an integrated circuit comprises circuitry that receives, from a decoding device, a message that indicates a maximum dynamic range of IDCT output values. In addition, the integrated circuit comprises circuitry that generates, in response to receiving the message, a first set of encoded media data that represents a set of one or more video frames. IDCT output values associated with the first set of encoded media data do not include an IDCT output value that is outside the indicated range. The integrated circuit also comprises circuitry that outputs the encoded media data to the decoding device.

In another aspect, a system comprises an encoding device and a decoding device. The decoding device comprises a first communications interface that receives from the encoding device a media object that includes a first set of encoded media data that represents a set of one or more video frames and a range indication element that indicates a maximum dynamic range of IDCT output values associated with the first set of encoded media data. The decoding device also comprises a range checking module that determines whether the maximum dynamic range of IDCT output values associated with the first set of encoded media data includes an IDCT output value that is outside a given range. In addition, the decoding device comprises a range negotiation module that causes the first communication interface to output to the encoding device a message that indicates the maximum dynamic range of IDCT output values when the maximum dynamic range of IDCT output values associated with the encoded media data includes an IDCT output value that is outside the given range. Furthermore, the decoding device comprises a first inverse transform module that uses a first operation to generate a set of IDCT output values based on the first set of encoded media data when the maximum dynamic range of IDCT output values associated with the first set of encoded media data does not include an IDCT output value that is outside the given range. In addition, the decoding device comprises a picture reconstruction module that uses the set of IDCT output values to generate reconstructed video frames associated with video frames in the set of video frames. The decoding device also comprises a presentation driver that causes a media presentation unit to present the reconstructed video frames. The encoding device comprises a second communications interface that receives, from the decoding device, the message that indicates the given range. The encoding device also comprises an encoding module that generates, in response to receiving the message, a second set of encoded media data that represents the set of one or more video frames. IDCT output values associated with the second set of encoded media data do not include an IDCT output value that is outside the given range. The second communications interface outputs the second set of encoded media data to the decoding device.

The techniques described in this disclosure may be implemented in hardware, software, firmware, or any combination thereof. If implemented in software, the software may be executed using one or more processors, such as microprocessors, application specific integrated circuits ("ASICs"), field programmable gate arrays ("FPGAs"), or digital signal processors ("DSPs"). The software that executes the techniques may be initially stored in a computer-readable medium and loaded and executed using the one or more processors.

Accordingly, this disclosure also contemplates a computer-readable medium that comprises executable instructions. When executed by one or more processors, the instructions cause the one or more processors to receive a media object that includes encoded media data that represents a set of one or more video frames and a range indication element that indicates a maximum dynamic range of IDCT output values associated with the encoded media data. In addition, the instructions cause the one or more processors to determine whether the maximum dynamic range of IDCT output values associated with the encoded media data includes an IDCT output value that is outside a given range. The instructions also cause the one or more processors to use a first operation to generate a set of IDCT output values based on the encoded media data when the maximum dynamic range of IDCT output values associated with the encoded media data does not include an IDCT output value that is outside the given range. In addition, the instructions cause the one or more processors to use the set of IDCT output values to generate reconstructed video frames associated with video frames in the set of video frames. The instructions further cause the one or more processors to cause a media presentation module to present the reconstructed video frames.

In another example, a computer-readable medium comprises instructions that, when executed by one or more processors, cause the one or more processors to receive, from a decoding device, a message that indicates a maximum dynamic range of IDCT output values. The instructions also cause the one or more processors to generate, in response to receiving the message, a first set of encoded media data that represents a set of one or more video frames. IDCT output values associated with the first set of encoded media data do not include an IDCT output value that is outside the indicated range. In addition, the instructions cause the one or more processors to output the encoded media data to the decoding device.

In some cases, the computer-readable medium may form part of a computer program product, which may be sold to manufacturers and/or used in a device. The computer program product may include the computer-readable medium, and in some cases, may also include packaging materials.

The details of one or more examples are set forth in the accompanying drawings and the description below. Other features, objects, and advantages will be apparent from the description and drawings, and from the claims.

DETAILED DESCRIPTION

Figure 1:
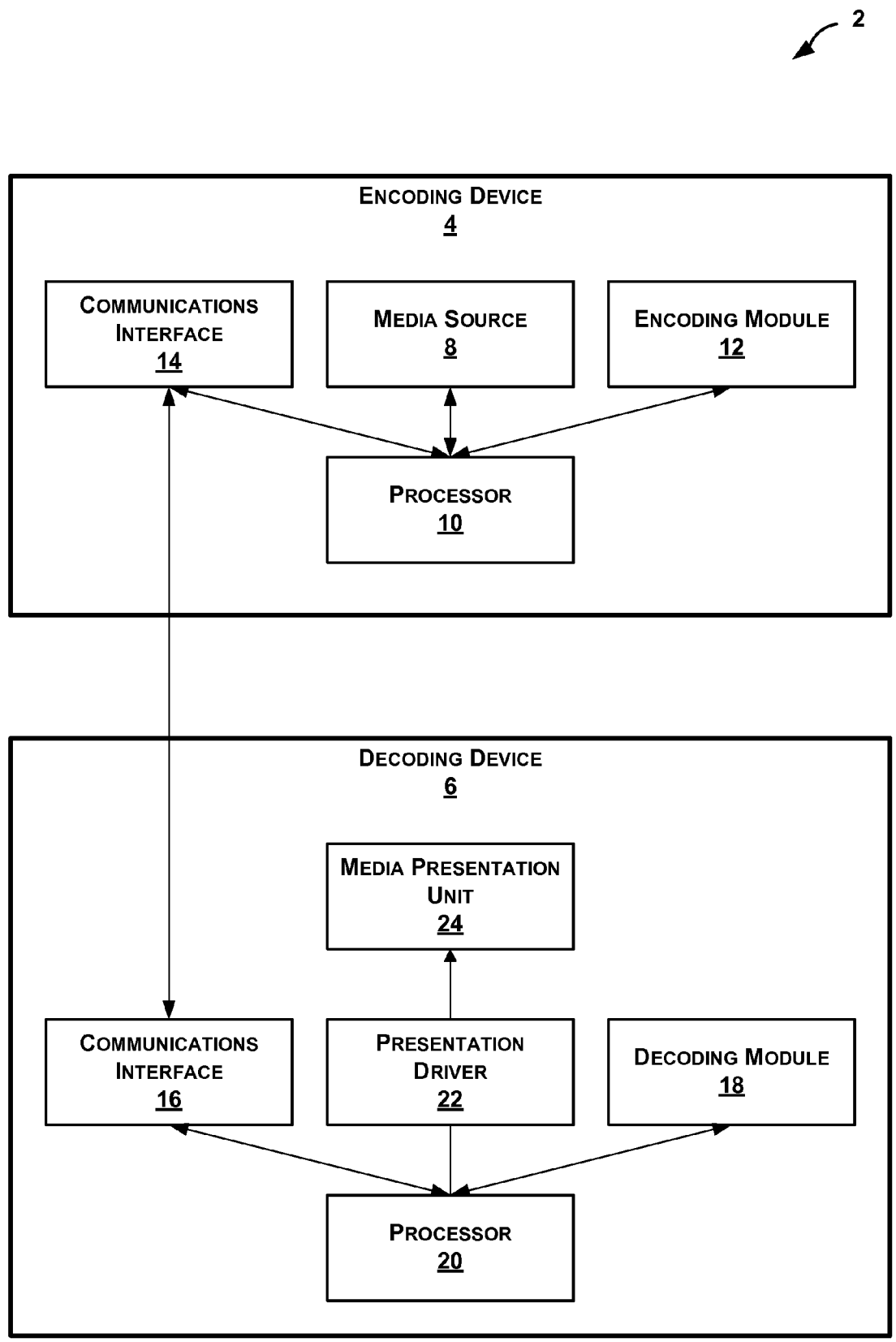
FIG. 1 is a block diagram illustrating an exemplary system that includes an encoding device and a decoding device.

FIG. 1 is a block diagram illustrating an exemplary system 2 that includes an encoding device 4 and a decoding device 6. It should be appreciated that system 2 is an exemplary system and that many other arrangements and implementations are possible.

Encoding device 4 and decoding device 6 may comprise personal computers, mobile radiotelephones, servers, network appliances, computers integrated into vehicles, video gaming platforms, portable video game devices, computer workstations, computer kiosks, digital signage, mainframe computers, television set-top boxes, network telephones, personal digital assistants, mobile media players, home media players, digital video projectors, or another types of electronic devices.

Encoding device 4 may include a media source 8 to generate media data. Media source 8 may comprise a digital video or still photo camera that captures image data. Media source 8 may be built into encoding device 4 or may be attached to encoding device 4 as a peripheral device or a network device.

In the example of FIG. 1, encoding device 4 also includes a processor 10. Processor 10 may be a digital signal processor ("DSP"), a microprocessor, an application-specific integrated circuit ("ASIC"), or some other type of integrated circuit. An encoding module 12 in encoding device 4 may encode media data generated by media source 8. Encoding module 12 may be implemented in a variety of ways. For example, encoding module 12 may comprise instructions that cause processor 10 to encode the media data from media source 8. In another example, encoding module 12 may be implemented as an integrated circuit that encodes the media data generated by media source 8. In yet another example, encoding module 12 may be a combination of one or more hardware and software units.

In the example of FIG. 1, encoding device 4 also includes a communications interface 14. Communications interface 14 enables encoding device 4 to send data to and receive data from one or more other devices, including decoding device 6. Communications interface 14 may be any of a wide variety of interface types. For example, communications interface 14 may be a type of network interface. Types of wireless interfaces include Ethernet interfaces, token-ring interfaces, Wi-Fi interfaces, WiMax interfaces, Wireless Broadband interfaces, Asynchronous Transfer Mode ("ATM") interfaces, Bluetooth interfaces, or other types of wired or wireless network interfaces. In another example, communications interface 14 may be a device interface bus such as a Universal Serial Bus ("USB") interface, a FireWire interface, a serial cable interface, or another type of device interface.

Decoding device 6 may include a communications interface 16. Like communications interface 14, communications interface 16 may be any of a wide variety of interface types. For instance, communications interface 16 may be a network interface, a device interface bus, or another type of interface. Communications interface 16 may send and receive many different kinds of data. For example, communications interface 16 may receive a media object. As used in this disclosure, a "media object" is a set of data from which audible and/or visible signals may be derived and played back. For instance, a "media object" may be a video bitstream, an audio or video file, or another type of data from which audible and/or visible signals may be derived and played back.

When communications interface 16 receives a media object, a decoding module 18 in decoding device 6 may decode encoded media data in the media object. Decoding module 18 may be implemented in a variety of ways. For example, decoding module 18 may comprise an integrated circuit that decodes the encoded media data in the media object. In another example, decoding module 18 may be implemented as a series of instructions that, when executed by a processor 20 in decoding device 6, cause processor 20 to decode the encoded media data in the media object. Processor 20 may be a microprocessor, a digital signal processor, an ASIC, or other type of integrated circuit. Processor 20 may use fixed-point arithmetic to perform numerical calculations, as is common in smaller devices, such as mobile telephones. For example, processor 20 may use 16-bit registers to store values for numerical calculations.

A presentation driver 22 in decoding device 6 causes a media presentation module 24 to present media data decoded by decoding module 18. In other words, presentation driver 22 may cause media presentation module 24 to output audible and/or visible signals that represent the decoded media data. For example, media presentation module 24 may comprise a computer monitor that presents video data. Media presentation module 24 may be integrated into decoding device 6 or may be connected to decoding device 6 as a peripheral device via one or more wired or wireless links. Presentation driver 22 may comprise a device driver or other software that executes on processor 20, a hardware or firmware unit, or some other mechanism that causes media presentation module 24 to present media data.

When encoding module 12 encodes a set of one or more video frames included in the media data generated by media source 8, encoding module 12 may generate matrixes of coefficients by performing a forward discrete cosine transform ("FDCT") on blocks of pixel component values in video frames in the set of video frames. After generating a matrix of coefficients, encoding module 12 may generate a matrix of quantized coefficients by quantizing the coefficients in the matrix of coefficients. Quantizing the coefficients in the matrix of coefficients may reduce the amount of information associated with high-frequency coefficients in the matrix of coefficients.

After encoding module 12 generates the set of matrixes of quantized coefficients for video frames in the set of video frames, encoding module 12 may determine a maximum dynamic range of inverse discrete cosine transform ("IDCT") output values associated with the matrixes of quantized coefficients. The IDCT output values associated with a matrix of quantized coefficients represent IDCT output values in a matrix of IDCT output values that would result from generating a matrix of inverse quantized coefficients by inverse quantizing the matrix of quantized coefficients and then generating the matrix of IDCT output values by performing an IDCT on the matrix of inverse quantized coefficients. For example, encoding module 12 may determine that IDCT output values associated with the set of matrixes of quantized coefficients are within a range from −1805 to 1805.

After encoding module 12 identifies the maximum dynamic range of IDCT output values associated with the set of matrixes of quantized coefficients, encoding module 12 may generate a media object that includes entropy-encoded versions of the matrixes of quantized coefficients associated with the set of video frames, motion data associated with the set of video frames, and a range indication element. For example, encoding module 12 may generate an MPEG-2 transport stream that includes the entropy-encoded versions of the matrixes of quantized coefficients associated with the set of video frames and a bitstream header element that indicates the maximum dynamic range of IDCT output values associated with the matrixes of quantized coefficients. The range indication element indicates a maximum dynamic range of IDCT output values in the matrixes of quantized coefficients associated with the set of video frames.

The range indication element may indicate the range of IDCT output values in a variety of ways. In a first example, the range indication element may explicitly specify or otherwise indicate a maximum number of bits required to represent any IDCT output value in the matrixes of quantized coefficients associated with the set of video frames. In a second example, the range indication element may explicitly specify or otherwise indicate a maximum IDCT output value and a minimum IDCT output value in the matrixes of quantized coefficients associated with the set of video frames.

Encoding module 12 may perform a variety of actions after generating the media object. For example, encoding module 12 may cause communications interface 14 to output the media object to decoding device 6 or another device. In another example, encoding module 12 may store the media object in a computer-readable medium (not shown) for later use.

Communications interface 16 may receive a media object that includes a set of encoded media data associated with a set of video frames, a set of motion data associated with the set of video frames, and a range indication element. When communications interface 16 receives such a media object, decoding module 18 may extract the range indication element from the media object. After extracting the range indication element, decoding module 18 may determine whether the range indicated by the range indication element includes an IDCT output value that is outside a given range. This given range may be the range of IDCT output values that decoding module 18 is capable of producing. For example, the range indication element may indicate that IDCT output values associated with the encoded media data are in a range [−1024, 1023] and decoding module 18 may only be capable of producing IDCT output values in a range [−256, 255]. Hence, in this example, decoding module 18 may determine that the range indicated by the range indication element includes an IDCT output value that is outside the range of IDCT output values that decoding module 18 is capable of producing.

If decoding module 18 determines that the range indicated by the range indication element is not greater than the given range, decoding module 18 may then perform an entropy decoding process on the set of encoded media data in the media object, thereby generating a set of matrixes of quantized coefficients associated with the set of video frames. In addition, decoding module 18 may perform an entropy decoding process on the motion data in the media object. Decoding module 18 may then generate matrixes of inverse quantized coefficients by performing an inverse quantization operation on each of the matrixes of quantized coefficients associated with the set of video frames. Next, decoding module 18 may apply an IDCT to each of the matrixes of inverse quantized coefficients to derive matrixes of IDCT output values. Decoding module 18 may generate reconstructed residual pictures associated with the set of video frames by reassembling the matrixes of IDCT output values. After generating the reconstructed residual pictures, decoding module 18 may generate reconstructed versions of the original video frames using the reconstructed residual pictures and predicted pictures generated with the sets of motion data associated with the set of video frames. Presentation driver 22 may then cause media presentation module 24 to output visible signals that present the reconstructed versions of the original set of video frames.

The techniques described in this disclosure may provide several advantages. For example, if a decoding device attempts to apply an IDCT to a matrix of coefficients that should produce IDCT output values that the decoding device is not capable of producing, serious differences between the original media data and the decoded media data may result. Such differences may significantly diminish the quality of the decoded media data. The techniques described in this disclosure may prevent the decoding device from decoding media data when the decoding device is unable to produce the IDCT output values associated with the encoded version of the media data.

The following example illustrates this point. A typical pixel component value in a residual picture may range from −256 to 255. Thus, a pixel component value may be one of 511 different possible values. For this reason, nine bits are required to represent each of these 511 possible values (i.e., $2^9$=512). In an ideal case, an IDCT should, in this example, produce IDCT output values (i.e., pixel component values in a residual picture) that range from −256 to 255. However, due to errors caused by quantizing the coefficients, an IDCT may produce IDCT output values that range from −1805 to 1805. Thus, an IDCT output value may be one of 3610 different possible values. Twelve bits would be required to represent each of these 3610 possible values (i.e., $2^{11}$=2048 is insufficient, so $2^{12}$=4096 may be required). In order to minimize cost and complexity, processor 20 might use 16-bit registers to store numerical values. Moreover, a last stage of an algorithm used by decoding module 18 to apply an IDCT may require a right shift by seven positions. For this reason, when decoding module 18 executes on processor 20, there are only nine bits remaining to represent the IDCT output values (i.e., 16−7=9). Because there are only nine bits to represent the IDCT output values, the IDCT output values may be no greater than 255 and no less than −256. Consequently, when processor 20 executes the instructions of decoding module 18 to perform an inverse discrete cosine transform, processor 20 might produce significant errors when processing values that are less than −256 or greater than 255.

Figure 2:
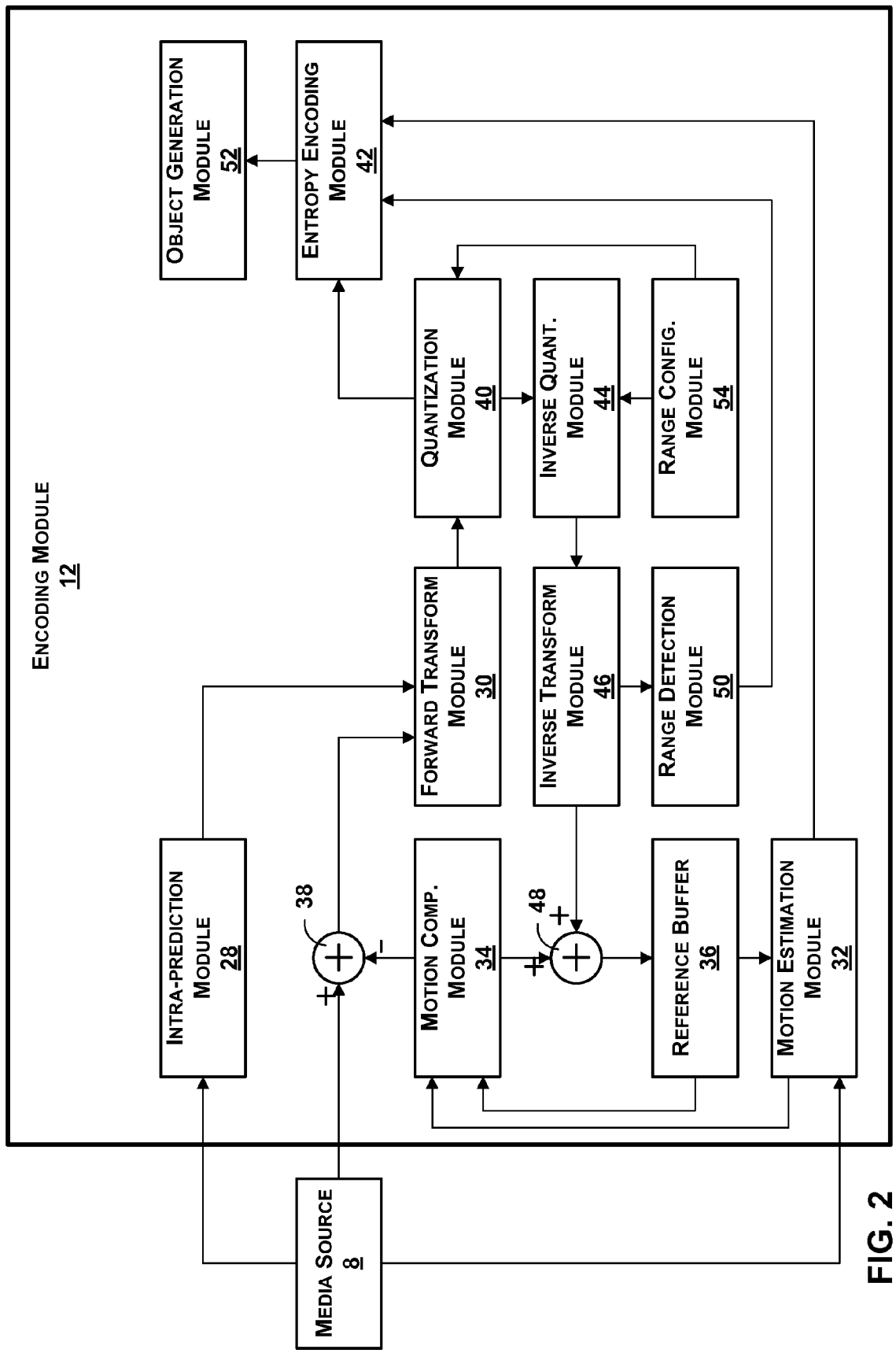
FIG. 2 is a block diagram illustrating exemplary details of an encoding module.

FIG. 2 is a block diagram illustrating example details of encoding module 12. Encoding module 12 may comprise a set of "modules." These modules may comprise subsets of the software instructions of encoding module 12. Alternatively, these modules may comprise ASICs. In another alternative, these modules may comprise software instructions and ASICs.

As illustrated in the example of FIG. 2, encoding module 12 may receive a set of one or more unencoded video frames from media source 8. The set of video frames may include a single video frame, one or more "groups of pictures", or other numbers of video frames. Each video frame received from media source 8 may include one or more slices. The slices of a video frame are discrete portions of the video frame that together include the entire video frame. For instance, the Advanced Video Coding ("AVC")/H.264 standard specifies that there may be one or more slices for each video frame. However, the Motion Pictures Experts Group ("MPEG")-2 standard does not include the concept of a slice. Rather, in the MPEG-2 standard, only complete video frames are considered. In order to maintain generality, this disclosure uses the term "picture" to refer to an area of a video frame that may or may not include the entire video frame.

When encoding module 12 receives a picture (i.e., a "current picture") associated with a video frame in a set of video frames generated by media source 8, an intra-prediction module 28 in encoding module 12 may divide the current picture into a set of partitions. These partitions may be of equal or unequal size. For example, if encoding module 12 is encoding the pictures in the set of video frames in accordance with the MPEG-2 standard, intra-prediction module 28 may divide the current picture in partitions that are 16 pixels wide and 16 pixels high. In the context of the MPEG-2 standard, these partitions are referred to as "macroblocks." In another example, if encoding module 12 is encoding the pictures in the set of video frames in accordance with the AVC/H.264 standard, intra-prediction module 28 may divide the current picture into partitions that may have the dimensions of 16×16, 16×8, 8×16, 8×8, 4×8, 8×4, and 4×4. Furthermore, if encoding module 12 is encoding the pictures in the set of video frames in accordance with the AVC/H.264 standard, intra-prediction module 28 may identify an intra-coding mode for each of the identified partitions of the current picture. For instance, the AVC/H.264 standard specifies four different intra-coding modes for partitions that are sixteen pixels wide and sixteen pixels high. In addition, the AVC/H.264 standard specifies nine different intra-coding modes for partitions that are four pixels wide by four pixels high. After identifying the partitions of the current picture, intra-prediction module 28 may provide the partitions of the current picture to a forward transform module 44. In addition, if encoding module 12 is encoding the set of pictures in accordance with the AVC/H.264 standard, intra-prediction module 28 may provide to forward transform module 44 information that specifies the intra-coding mode of each of the partitions of the current picture.

Furthermore, when encoding module 12 receives the current picture from media source 8, a motion estimation module 32 in encoding module 12 performs motion estimation on the current picture. In order to perform motion estimation on the current picture, motion estimation module 32 may first determine whether the current picture is to be encoded as an intra-coded picture or an inter-coded picture. If motion estimation module 32 determines that the current picture is to be encoded as an intra-coded picture, motion estimation module 32 may not perform any further action. However, if motion estimation module 32 determines that the current picture is to be encoded as an inter-coded picture, motion estimation module 32 may divide the current picture into a set of partitions. Motion estimation module 32 may then generate motion data for each partition of the current picture. The type of motion data may depend on whether the current picture is to be encoded as a predictive picture ("P-picture") or as a bi-predictive picture ("B-picture"). Accordingly, motion estimation module 32 may determine whether the current picture is to be encoded as a P-picture or as a B-picture.

If motion estimation module 32 determines that the current picture is to be encoded as a P-picture, motion estimation module 32 may, for each partition of the current picture, attempt to identify a corresponding area of a preceding picture in a reference buffer 36. If motion estimation module 32 successfully identifies an area of a picture in reference buffer 36 that corresponds to a partition in the current picture, motion estimation module 32 may generate a motion vector that indicates a vertical displacement and a horizontal displacement between the identified area and the partition. For example, motion estimation module 32 may generate a motion vector that indicates that the identified area is 10 pixels below the partition of the current picture and 2.5 pixels to the right of the partition of the current picture.

If motion estimation module 32 determines that the current picture is to be encoded as a B-picture, motion estimation module 32 may, for each partition of the current picture, attempt to identify a corresponding area of a first picture in reference buffer 36 and a corresponding area of a second picture in reference buffer 36. If encoding module 12 is encoding the set of video frames in accordance with the MPEG-2 standard, the first picture precedes the video frame associated with the current picture and the second picture follows the video frame associated with the current picture. Motion estimation module 32 may then generate motion data for the partition that specifies two motion vectors. The first of these motion vectors may indicate a displacement from an identified area in a preceding picture and the second of these motion vectors may indicate a displacement from an identified area of a subsequent picture. If motion estimation module 32 does not successfully identify an area of a picture in reference buffer 36 that corresponds to a partition of the current picture, motion estimation module 32 may generate motion data that indicates that there is no displacement between the partition and the equivalently located area of a preceding picture. If encoding module 12 is encoding the set of video frames in accordance with the AVC/H.264 standard, both the first picture and the second picture may precede or follow the video frame associated with the current picture or the first picture may precede the video frame associated with the current picture and the second picture may follow the video frame associated with the current picture. Motion estimation module 32 may then, depending on an encoding type of the partition, generate motion data that indicates the identified areas in the reference frames.

After motion estimation module 32 generates motion data for each partition of the current picture, motion estimation module 32 may provide the motion data to a motion compensation module 34 ("MOTION COMP. MODULE") in encoding module 12. Motion compensation module 34 may use the motion data for the partitions of the current picture to generate a predicted picture for the current picture. In order to generate the predictive picture for the current picture, motion compensation module 34 may determine whether encoding module 12 is encoding the current picture as a P-picture or as a B-picture.

If encoding module 12 is encoding the current picture as a P-picture, the motion data associated with the current picture may specify one or more motion vectors and one or more pictures in reference buffer 30 for each partition of the current picture. Motion compensation module 34 may retrieve from reference buffer 36 each reference picture indicated by the motion data associated with the current picture. After retrieving the reference pictures from reference buffer 36, motion compensation module 34 may, for each partition of the current picture, use the motion vectors of the partition to identify corresponding areas in one or more of the retrieved reference pictures and then copy the identified areas into the partition of the current picture. In this way, motion compensation module 34 "moves" areas from the reference pictures into appropriate locations in the predictive picture associated with the current picture.

If encoding module 12 is encoding the current picture as a B-picture, the content of the motion data associated with the current picture may depend on the video coding standard used to encode the current picture. For example, the MPEG-2 standard specifies that the motion data associated with a "macroblock" of the current picture specifies an area of a reference picture that precedes the video frame associated with the current picture and specifies an area of a reference picture follows the video frame associated with the current picture. In a second example, the AVC/H.264 standard specifies that the motion data associated with a partition of the current picture may specify two or more reference pictures that occur either before or after the video frame associated with the current picture. In either example, motion compensation module 76 may, for each partition of the predicted picture, interpolate the pixel component values of the partition based on areas of the reference pictures indicated by the motion data associated with the partition.

After motion compensation module 34 generates the predictive picture associated with the current picture, a residual picture construction module 38 in encoding module 12 may use the current picture generated by media source 8 and the predictive picture generated by motion compensation module 34 to generate a residual picture associated with the current picture. For instance, residual picture construction module 38 may generate the residual picture by adding a negative version of the predictive picture with the current picture. The residual picture may contain less information than the current picture and, consequently, may be encoded using fewer bits than the current picture. After residual picture construction module 38 generates the residual picture for the current picture, residual picture construction module 38 may provide the residual picture to a forward transform module 30.

When forward transform module 30 receives the residual picture from residual picture construction module 38 or receives the original version of the current picture with intra-coding instructions from intra-prediction module 28, forward transform module 30 may separate the picture into blocks of pixels. For example, forward transform module 30 may split the picture into blocks of pixels, each of which may constitute 64 pixels in an 8×8 block. Forward transform module 30 may then, for each of the blocks of pixels, separate the color components of the pixels in the block into matrixes of pixel component values. For example, forward transform module 30 may extract a matrix of Y values, a matrix of Cr values, and a matrix of Cb values from the block of pixels. The Y values may specify the brightness of pixels, Cr values may specify red chrominance of pixels minus the Y values, and the Cb values may specify blue chrominance of pixels minus the Y values.

When forward transform module 30 has extracted the matrixes of pixel component values, forward transform module 30 may, for each of the matrixes of pixel component values, generate a matrix of coefficients by applying a two-dimensional forward discrete cosine transform to the matrix of pixel component values. Forward transform module 30 may generate the matrix of coefficients in a variety of ways. For instance, forward transform module 30 may utilize a floating point module in processor 20 to generate the matrix of coefficients. Forward transform module 30 may begin a process of applying a discrete cosine transform by left-shifting each of the pixel component values. For instance, forward transform module 30 may left-shift each of the pixel component values by a number of bits of precision removed by applying discrete cosine transforms and a number of bits of precision removed by dividing by scale factors after applying the discrete cosine transform. Forward transform module 30 may perform a discrete cosine transform on each of the row vectors of the matrix of coefficients. Performing a discrete cosine transform on each of the row vectors of the matrix of coefficients generates a matrix of intermediate values. Next, forward transform module 30 may perform a discrete cosine transform on each of the column vectors of the matrix of intermediate values. Performing a discrete cosine transform on each of the column vectors of the matrix of intermediate values results in a matrix of coefficient values.

When forward transform module 30 generates a matrix of coefficients, a quantization module 40 in encoding module 12 may generate a matrix of quantized coefficients by quantizing the coefficients in the matrix of coefficients. Quantization module 46 may quantize the coefficients in the matrix of coefficients by dividing each coefficient in the matrix of coefficients by a number at an equivalent position in a custom or a standard quantization matrix and then rounding the resulting quotients to generate quantized coefficients. For example, quantization module 40 may divide each coefficient by following standard quantization matrix:

$$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

After quantization module 40 quantizes a matrix of quantized coefficients, quantization module 40 may provide the matrix of quantized coefficients to an entropy encoding module 42 in encoding module 12 and an inverse quantization module 44 in encoding module 12.

Upon receiving a matrix of quantized coefficients from quantization module 40, entropy encoding module 42 may generate a set of encoded media data by applying an entropy encoding scheme to the matrix of quantized coefficients. For instance, entropy encoding module 42 may apply a Huffman or a context-adaptive arithmetic coding scheme to the matrix of quantized coefficients. To apply an entropy encoding scheme to a matrix of quantized coefficients, entropy encoding module 42 may generate a vector of the quantized coefficients in the matrix of quantized coefficients by performing a zigzag scan of the quantized coefficients in the matrix of quantized coefficients. In other words, entropy encoding module 42 may arrange all of the quantized coefficients in the two dimensional matrix of quantized coefficients into a one-dimensional vector of quantized coefficients. Entropy encoding module 42 may then apply a run-length encoding scheme, such as Huffman coding or arithmetic coding, to the vector of quantized coefficients.

In addition to applying an entropy encoding scheme to matrixes of quantized coefficients, entropy encoding module 42 may apply an entropy encoding scheme to motion data associated with partitions of video frames in the sequence of video frames. For example, entropy encoding module 42 may apply a Huffman or a context-adaptive arithmetic coding to the motion data.

When inverse quantization module 44 receives a matrix of quantized coefficients from quantization module 40, inverse quantization module 44 generates a matrix of inverse quantized coefficients by performing an inverse quantization operation on the matrix of quantized coefficients. For instance, inverse quantization module 44 may generate the matrix of inverse quantized coefficients by multiplying each coefficient in the matrix of quantized coefficients by a number at an equivalent position of a quantization matrix used by quantization module 40. Because quantization module 40 rounds the coefficients after dividing the coefficients in the matrix of coefficients by the numbers in the quantization matrix, the matrix of inverse quantized coefficients may not be identical to the original matrix of coefficients. When inverse quantization module 44 generates a matrix of inverse quantized coefficients, inverse quantization module 44 may provide the matrix of inverse quantized coefficients to an inverse transform module 46 in encoding module 12.

When inverse transform module 46 receives a matrix of inverse quantized coefficients, inverse transform module 46 generates a matrix of IDCT output values by performing an IDCT on the matrix of inverse quantized coefficients. When inverse transform module 46 has generated a matrix of IDCT output values for each pixel component value of a block of pixels, inverse transform module 46 may use the matrixes of IDCT output values to generate a block of pixels in a reconstructed residual picture associated with the current picture. When inverse transform module 46 has reconstructed each block of pixels in the reconstructed residual picture associated with the current picture, inverse transform module 46 may reconstruct the residual picture by combining the reconstructed blocks of pixels. Next, inverse transform module 46 may provide the reconstructed residual picture to a picture reconstruction module 48 and a range detection module 54.

When picture reconstruction module 48 receives the reconstructed residual picture from inverse transform module 46, picture reconstruction module 48 may use the reconstructed residual picture generated by inverse transform module 46 and the predicted picture generated by motion compensation module 34 to generate a reconstructed version of the current picture. Picture reconstruction module 48 may generate the reconstructed version of the current picture by adding the reconstructed residual picture to the predicted picture. After generating the reconstructed version of the current picture, picture reconstruction module 48 may store the reconstructed version of the current picture into reference buffer 36. In this way, motion compensation module 34 may use the reconstructed version of the current picture as a reference picture for other frames in the set of video frames. Using reconstructed versions of pictures rather than original versions of pictures as reference pictures may result in more accurate predictive pictures.

Range detection module 50 may identify a maximum dynamic range of IDCT output values in the reconstructed residual pictures associated with video frames in the set of video frames. For ease of explanation, this disclosure may refer to IDCT output values in the reconstructed residual pictures associated with video frames in the set of video frames as "IDCT output values in the reconstructed residual pictures." For example, in the absence of quantization error, IDCT output values associated with the reconstructed residual pictures may fall within the range [−256, 255]. However, due to quantization error, IDCT output values in the reconstructed residual pictures may fall within the range [−1805, 1805]. In this example, range detection module 50 may identify the range [−1805, 1805] as the maximum dynamic range of IDCT output values in the reconstructed residual pictures. Additional information regarding the effect of quantization error on maximum dynamic ranges of IDCT output values can be found in

[1] Zhou M. and De Lameillieure J., "IDCT output range in MPEG video coding", Signal Processing: IMAGE COMMUNICATION, Vol. 11, No. 2, pp. 137-145, December 1997 the entire content of which is hereby incorporated by reference, and

[2] Y. Reznik, "On clipping and dynamic range of variables in IDCT designs", ISO/IEC JTC1/SC29 WG11 input document MPEG2006/M14004, October 2006, Hangzhou, China, the entire content of which is hereby incorporated by reference.

Range detection module 50 may identify the maximum dynamic range of IDCT output values in the reconstructed residual pictures in a variety of ways.

In a first example of how range detection module 50 may identify the maximum dynamic range of IDCT output values in the reconstructed residual pictures, range detection module 50 may, upon receiving a reconstructed residual picture associated with the current picture from inverse transform module 46, identify a greatest IDCT output value in the reconstructed residual picture and a lowest IDCT output value in the reconstructed residual picture. Range detection module 50 may then determine whether the greatest IDCT output value in the reconstructed residual picture is greater than a previously observed greatest IDCT output value in a reconstructed residual picture associated with the set of video frames. If range detection module 50 determines that the greatest IDCT output value in the reconstructed residual picture is greater than the previously observed greatest IDCT output value in a reconstructed residual picture associated with the set of video frames, range detection module 50 may set the greatest IDCT output value in the set of video frames to the greatest IDCT output value in the reconstructed residual picture. Similarly, range detection module 50 may determine whether the lowest IDCT output value in the reconstructed residual picture is less than a previously observed lowest IDCT output value in a reconstructed residual picture associated with the set of video frames. If range detection module 50 determines that the lowest IDCT output value in the reconstructed residual picture is less than the previously observed lowest IDCT output value in the set of video frames, range detection module 50 may set the lowest IDCT output value in a reconstructed residual picture associated with the set of video frames to the lowest IDCT value in the reconstructed residual picture. In this way, range detection module 50 may identify a greatest IDCT output value associated with the set of video frames and a lowest IDCT output value associated with the set of video frames.

In a second example of how range detection module 50 may identify the maximum dynamic range of IDCT output values associated with the reconstructed residual pictures, range detection module 50 may receive each reconstructed residual picture associated with the set of video frames. After receiving each reconstructed residual picture associated with the set of video frames, range detection module 50 may generate a temporary value by performing a bitwise "OR" operation on all of the IDCT output values in each of the reconstructed residual pictures associated with the set of video frames. Range detection module 50 may then determine a number of bits that are less significant than the most significant bit in this temporary value that is set to one. This number, plus one, is equal to the number of bits required to represent all IDCT output values in the reconstructed residual pictures associated with the set of video frames. The maximum number of bits required to represent any IDCT output value in the reconstructed residual pictures associated with the set of video frames may serve as an indicator of the maximum dynamic range of IDCT values in the reconstructed residual pictures associated with the set of video frames.

In a third example of how range detection module 50 may identify the maximum dynamic range of IDCT output values in the reconstructed residual pictures associated with the set of video frames, range detection module 50 may use the following formula to calculate a maximum dynamic range of IDCT output values associated with the reconstructed residual pictures associated with the set of video frames:

$$\left[\left(a - \frac{|a+b|}{2} + N\frac{b-a}{2}\right)\frac{\eta_{max}}{2}, \left(b + \frac{|a+b|}{2} + N\frac{b-a}{2}\right)\frac{\eta_{max}}{2}\right]$$

This formula is applicable to an N×N input block vector g with its elements in the interval [a, b] (b>a) and the matrix of quantized coefficients was quantized and inverse quantized with the quantization factor in the range [0, $\eta_{max}$], where $\eta_{max}$ is the maximum quantization factor.

After range detection module 50 identifies a maximum dynamic range of IDCT output values in the reconstructed residual pictures associated with the set of video frames, range detection module 50 may provide the identified range to an object generation module 52. Object generation module 52 may use the encoded sets of media data generated by entropy encoding module 42, the encoded sets of motion data generated by entropy encoding module 42, and the maximum dynamic range of IDCT output values identified by range detection module 50 to generate a media object. For instance, object generation module 52 may generate an MPEG-2 transport stream that specifies the encoded sets of media data, the encoded sets of motion data, and a bitstream element that indicates the maximum dynamic range of IDCT output values associated with the set of video frames.

In the example of FIG. 2, encoding module 12 also comprises a range configuration module 54 ("RANGE CONFIG. MODULE"). Range configuration module 54 configures encoding module 12 to encode the set of video frames such that IDCT output values in reconstructed residual pictures associated with the set of video frames fall within a given range of IDCT output values. For example, decoding device 6 may receive a media object generated by encoding device 4 that includes encoded media data associated with a set of video frames. In this example, decoding device 6 may determine whether the range indication element in the media object indicates that IDCT output values associated with the encoded media data fall outside the given range. For instance, in this example, the given range may be a range of IDCT output values that decoding device 6 may produce using a 16-bit digital signal processor ("DSP"). Furthermore, in this example, if decoding device 6 determines that the range indication element indicates that one or more IDCT output values associated with the encoded media data fall outside the given range, decoding device 6 may send one or more messages to encoding device 4 indicating that one or more IDCT output values associated with the encoded media data fall outside the given range. When communications interface 14 in encoding device 4 receives such messages, range configuration module

54 may reconfigure encoding module 12 to encode the set of video frames such that encoding module 12 produces an alternative media object that includes an alternate set of media data associated with the same set of video frames. The IDCT output values associated with the alternate set of media data fall within the given range of IDCT output values indicated by decoding device 6.

Range configuration module 54 may reconfigure encoding module 12 in a variety of ways. For example, range configuration module 54 may cause encoding module 12 to generate a new media object that does not cause decoding device 6 to produce IDCT output values that are outside the given range. For example, range configuration module 54 may cause quantization module 40 to generate alternate matrixes of quantized coefficients by using an alternate quantization matrix to quantize coefficients in matrixes of coefficients generated by forward transform module 30. After quantization module 40 generates the alternate matrixes of quantized coefficients, inverse quantization module 44 may generate alternate matrixes of inverse quantized coefficients by using the alternate quantization matrix to inverse quantize the quantized coefficients in the alternate matrixes of quantized coefficients. Next, inverse transform module 46 may generate alternate residual pictures by performing an IDCT on the alternate matrixes of inverse quantized coefficients. Range detection module 50 may calculate a new maximum dynamic range for IDCT output values in the alternate residual pictures generated by inverse transform module 50. Entropy encoding module 42 may then perform an entropy encoding operation on the alternate set of matrixes of quantized coefficients. Object generation module 52 may then generate an alternate media object that specifies the alternate set of matrixes of quantized coefficients and a bitstream element that indicates the new maximum dynamic range of IDCT output values associated with the set of video frames. Encoding device 4 may then send the alternate media object to decoding device 6.

Figure 3:
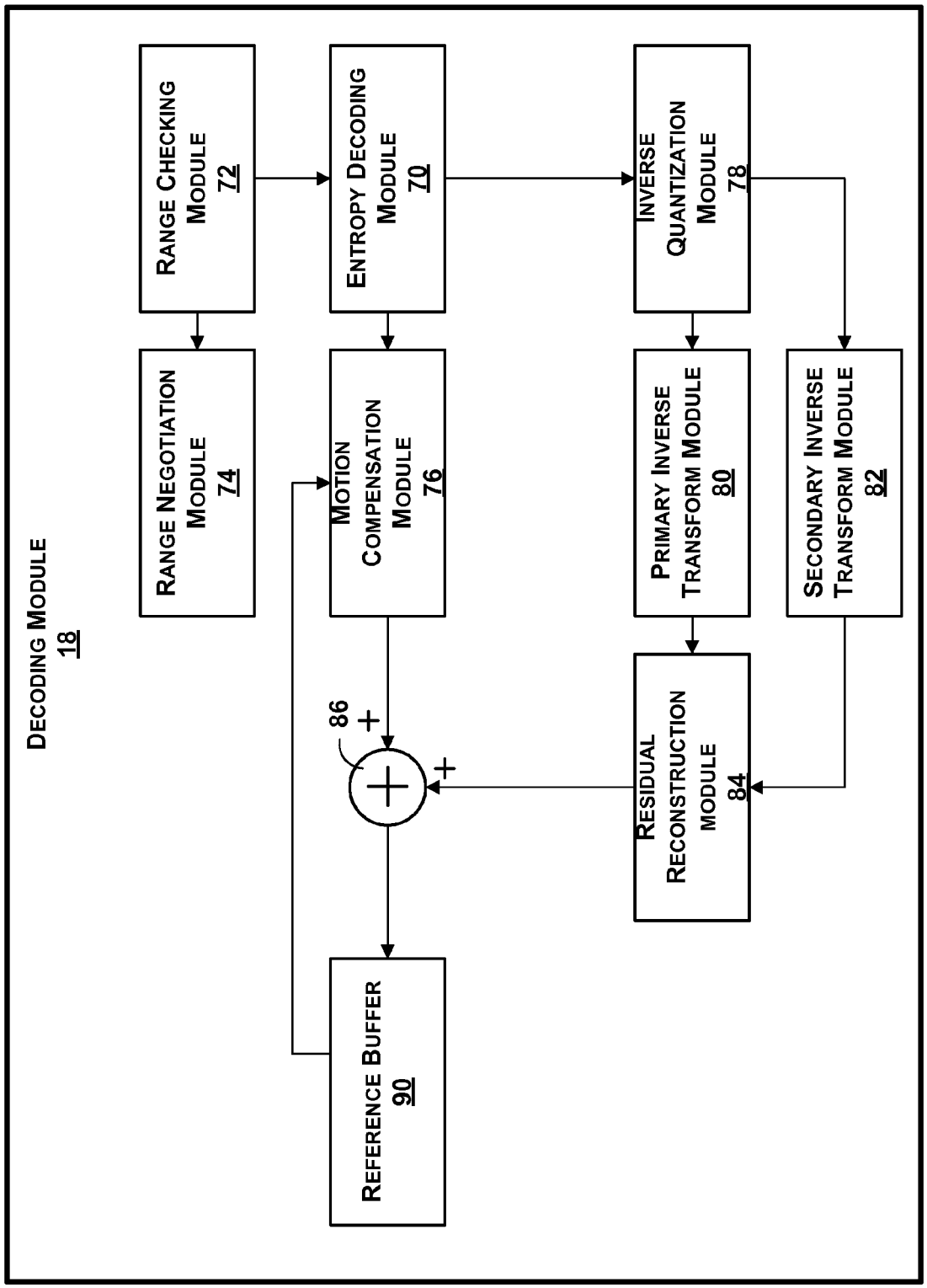
FIG. 3 is a block diagram illustrating exemplary details of a decoding module.

FIG. 3 is a block diagram illustrating exemplary details of decoding module 18. Decoding module 18 may comprise an entropy decoding module 70, a range checking module 72, a range negotiation module 74, a motion compensation module 76, an inverse quantization module 78, a primary inverse transform module 80, a secondary inverse transform module 82, a residual reconstruction module 84, and a picture reconstruction module 86. These modules may comprise subsets of the software instructions of decoding module 18. Alternatively, these modules may comprise ASICs within processor 20. In another alternative, these modules may comprise software instructions and ASICs.

Decoding module 18 may receive a media object that includes a set of encoded media data, a set of encoded motion data, and a range indication element. The set of encoded media data in the media object is associated with a set of video frames. The set of encoded motion data in the media object is associated with the set of encoded media data. The range indication element in the media object indicates a maximum dynamic range of pixel component values in reconstructed residual pictures associated with video frames in the set of video frames. As described above, this disclosure refers to pixel component values in reconstructed residual pictures based on encoded media data associated with the set of video frames as "IDCT output values associated with the set of encoded media data".

When decoding module 18 receives the media object, range checking module 72 may determine whether the range of IDCT output values indicated by the range indication element is within a given range. In the example of FIG. 3, this given range may be the range of IDCT output values that primary inverse transform module 80 is capable of producing. For instance, the range indication element may indicate that IDCT output values associated with the set of encoded media data range from −256 to 255. Primary inverse transform 80 uses a first operation to apply an IDCT to a matrix of inverse quantized coefficients. If primary inverse transform module 80 is capable of producing IDCT output values that range from −256 to 255, then range checking module 72 may determine that primary inverse transform module 80 is capable of producing any IDCT output value in the range of IDCT output values indicated by the range indication element. However, if the range indication element indicates that IDCT output values associated with the set of encoded media data range from −1805 to 1805, range checking module 72 may determine that primary inverse transform module 80 is not capable of producing one or more IDCT output values in the range of IDCT output values indicated by the range indication element.

There may be a variety of reasons why primary inverse transform module 80 is only capable of producing a limited range of IDCT output values when performing the first operation. For instance, primary inverse transform module 80 may implement an IDCT algorithm that is only capable of generating IDCT output values that may be represented using a nine bit two's-complement format. Such an IDCT algorithm may be advantageous because the IDCT algorithm may be implemented on 16-bit platforms. Many modern mobile handsets and other wireless communication devices include 16-bit DSPs that may be able to implement this IDCT algorithm. Research has shown that MPEG-1 and MPEG-2 may produce IDCT output values in the range of [−1805, 1805]. IDCT output values in the range of [−1805, 1805] cannot be represented in nine bit two's-complement format. Rather, IDCT output values in the range of [−1805, 1805] may be required to be represented in a twelve bit two's complement format. It might not be possible to implement an IDCT algorithm that generates twelve bit two's complement IDCT output values on a 16-bit platform.

If range checking module 72 determines that primary inverse transform module 80 is not capable of producing one or more IDCT output values in the range of IDCT output values indicated by the range indication element, range checking module 72 may perform a variety of different actions.

In a first example, when range checking module 72 determines that primary inverse transform module 80 is not capable of producing one or more IDCT output values in the range of IDCT output values indicated by the range indication element, range checking module 72 may cause a range negotiation module 74 in decoding module 18 to attempt to obtain an alternative version of the media object. Reconstructed residual pictures based on encoded media data associated with video frames in the alternate version of the media object do not contain an IDCT output value that is greater than or less than the greatest or the lowest IDCT output value that primary inverse transform module 80 is capable of producing. In order to attempt to obtain the alternative version of the media object, range negotiation module 74 may use communications interface 16 to communicate with encoding device 4. In response to this communication, encoding device 4 may generate the alternative version of the media object. Encoding device 4 may use a variety of techniques to generate the alternative version of the media object. For instance, in the example of FIG. 2, quantization module 40 may use a different quantization matrix when quantizing matrixes of coefficients generated by forward transform module 30.

In a second example, when range checking module 72 determines that primary inverse transform module 80 is not capable of producing one or more IDCT output values in the range of IDCT output values indicated by the range indication element, range checking module 72 may cause secondary inverse transform module 82 to generate the IDCT output values rather than primary inverse transform module 80. Secondary inverse transform module 82 performs a second operation to apply an IDCT to a matrix of inverse quantized coefficients. In this second example, secondary inverse transform module 82 is capable of producing all of the IDCT output values in the range of IDCT output values indicated by the range indication element. However, secondary inverse transform module 80 may take a longer time and/or consume more electrical power to generate the IDCT output values than primary inverse transform module 80.

When range checking module 72 determines that primary inverse transform module 80 is capable of producing all of the IDCT output values in the range of IDCT output values indicated by the range indication element, entropy decoding module 70 may apply an entropy decoding scheme to the set of encoded media data in the media object. As a result of applying the entropy decoding scheme to the set of encoded media data, entropy decoding module 70 generates a set of matrixes of quantized coefficients associated with one or more pictures. Furthermore, entropy decoding module 70 may apply an entropy decoding scheme to the set of encoded motion data in the media object. As a result of applying the entropy decoding scheme to the set of encoded motion data, entropy decoding module 70 generates motion data for each partition of one or more pictures associated with the set of video frames. After entropy decoding module 70 generates a set of matrixes of quantized coefficients associated with a picture, entropy decoding module 70 may provide the set of matrixes of quantized coefficients associated with the picture to primary inverse transform module 80 and may provide the motion data associated with the picture to a motion compensation module 76.

When motion compensation module 76 receives the set of motion data associated with the current picture, motion compensation module 76 determines whether the current picture is encoded as an I-picture, a P-picture, or a B-picture. If the current picture is encoded as an I-picture, motion compensation module 76 may generate a "reconstructed predicted picture" in which each pixel component value is equal to zero.

If the current picture is encoded as a P-picture, the motion data associated with the current picture may include a motion vector for each partition of the current picture. As discussed above, a motion vector associated with a partition of the current picture may indicate a reference picture and a displacement between an area in the indicated reference picture and the partition of the current picture. When motion compensation module 76 determines that the current picture is encoded a P-picture, motion compensation module 76 may retrieve from a reference buffer 90 each of the pictures indicated by the motion vectors in the set of motion data associated with the current picture. After retrieving the reference pictures, motion compensation module 76 may use the reference pictures and the motion vectors to generate a predicted picture associated with the current picture. The predicted picture has partitions that are the same as the partitions of the current picture. In order to generate the predicted picture associated with the current picture, motion compensation module 76 may, for each partition of the predicted picture, copy the area of a reference picture indicated by the motion vector associated with a corresponding partition of the current picture to the partition of the predicted picture.

If the current picture is encoded as a B-picture, the content of the motion data associated with the current picture may depend on the video coding standard used to encode the current picture. For example, the MPEG-2 standard specifies that the motion data associated with a "macroblock" of the current picture specifies an area of a reference picture that precedes the video frame associated with the current picture and specifies an area of a reference picture that follows the video frame associated with the current picture. In a second example, the AVC/H.264 standard specifies that the motion data associated with a partition of the current picture may specify two or more reference pictures that occur either before or after the video frame associated with the current picture. In either example, motion compensation module 76 may, for each partition of the predicted picture, interpolate the pixel component values of the partition based on areas of the reference frames indicated by the motion data associated with the partition.

When inverse quantization module 78 receives matrixes of quantized coefficients from entropy decoding module 70, inverse quantization module 78 may generate a set of matrixes of inverse quantized coefficients associated with the current picture by performing an inverse quantization operation on each of the matrixes of quantized coefficients associated with the current picture. Inverse quantization module 78 may perform the inverse quantization operation on the coefficients in a matrix of quantized coefficients by multiplying each of the coefficients in the matrix of quantized coefficients by values at equivalent positions in a quantization matrix.

Primary inverse transform module 80 may apply an IDCT to each of the matrixes in order to generate matrixes of pixel component values. Primary inverse transform module 80 may use a variety of different algorithms to apply the IDCT to a matrix of inverse quantized coefficients. For instance, if the matrix of inverse quantized coefficients is an 8×8 matrix, primary inverse transform module 80 may generate a matrix of intermediate coefficients by applying an 8-point one-dimensional IDCT to each row vector of the matrix of inverse quantized coefficients. In this instance, primary inverse transform module 80 may then generate a matrix of IDCT output values by applying the 8-point one-dimensional DCT TO EACH COLUMN VECTOR OF THE MATRIX OF intermediate coefficients. In another instance, primary inverse transform module 80 may generate a matrix of IDCT output values by applying a two-dimensional IDCT to the matrix of inverse quantized coefficients.

After primary inverse transform module 80 or secondary inverse transform module 82 generates a matrix of IDCT output values associated with the current picture, residual reconstruction module 84 may use the matrix of IDCT output values to generate a reconstructed residual picture associated with the current picture. Residual reconstructed module 84 may generate the reconstructed residual picture in a variety of ways. For example, residual reconstruction module 84 may generate a block of pixels by combining the matrix of IDCT output values with other matrixes of IDCT output values associated with equivalent positions of the current picture. In this example, residual reconstruction module 84 may receive a matrix of IDCT output values that represent luma values, a matrix of IDCT output values that represent Cb chrominance values, and a matrix of IDCT output values that represents Cr chrominance values. In this example, residual reconstruction module 84 may combine these matrixes of IDCT output values to create a block of pixels. When residual reconstruction module 84 finishes generating the block of pixels associated with the current picture, residual reconstruction module 84 may buffer the block of pixels until residual reconstruction module 84 has generated each block of pixels associated with the current picture. After residual reconstruction module 84 has generated each block of pixels associated with the current picture, residual reconstruction module 84 may combine the blocks of pixels associated with the current picture to form a reconstructed residual picture associated with the current picture.

A picture reconstruction module 86 in decoding module 18 uses the reconstructed residual picture associated with the current picture and the predicted picture associated with the current picture to generate a reconstructed version of the current picture. Picture reconstruction module 86 may use the reconstructed residual picture associated with the current picture and the predicted picture associated with the current picture to generate the reconstructed version of the current picture in a variety of ways. For instance, picture reconstruction module 86 may generate the reconstructed version of the current picture by adding each pixel component value in the reconstructed residual picture to an equivalently positioned pixel component value in the predicted picture. After picture reconstruction module 86 generates the reconstructed version of the current picture, picture reconstruction module 86 may store the reconstructed version of the current picture in reference buffer 90 so that motion compensation module 76 may use the reconstructed version of the current picture as a reference picture when performing motion compensation for other pictures associated with the set of video frames.

Figure 4:
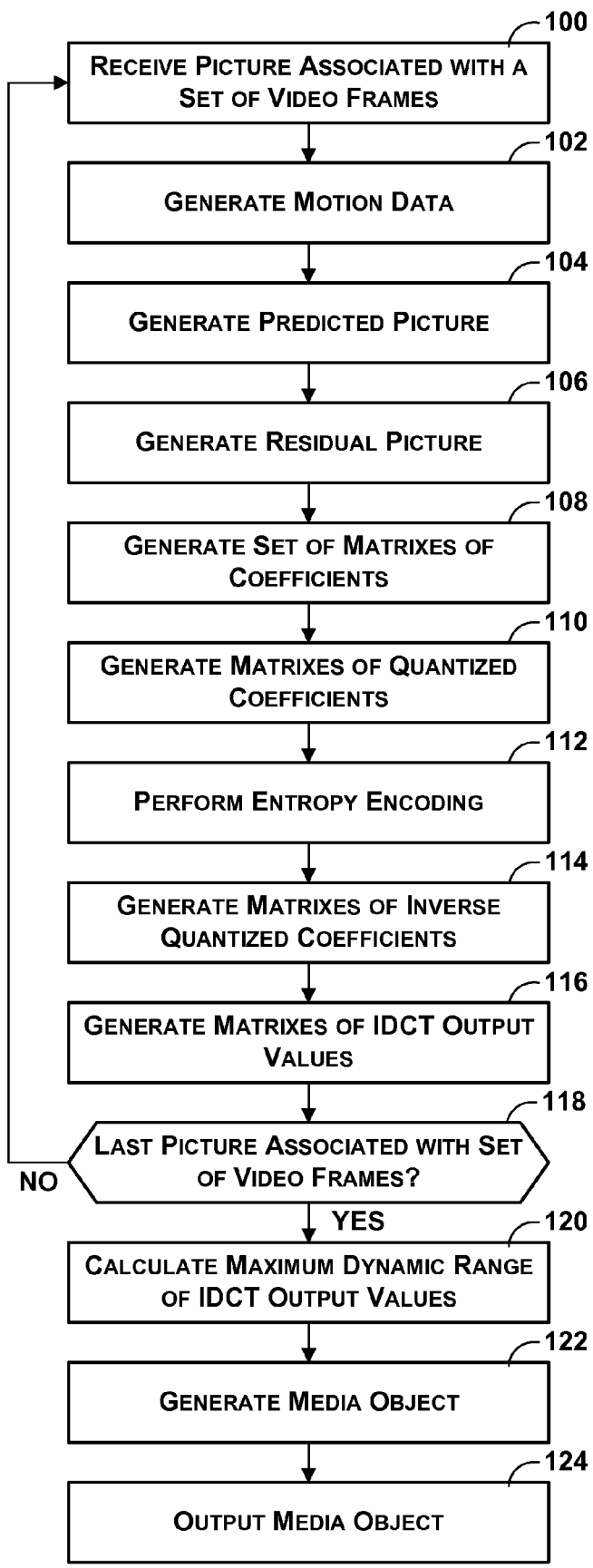
FIG. 4 is a flowchart illustrating an exemplary operation of the exemplary encoded module illustrated in FIG. 2.

FIG. 4 is a flowchart illustrating an example operation of encoding module 12 (FIG. 2). Initially, encoding module 12 receives a current picture associated with an unencoded video frame in a set of video frames from media source 8 (100). When encoding module 12 receives the current picture, motion estimation module 32 may generate motion data for the current picture by performing a motion estimation operation (102). For example, if encoding module 12 is encoding the current picture as a P-picture, motion estimation module 32 may generate a motion vector for each partition of the current picture. After motion estimation module 32 generates the motion data for the current picture, motion compensation module 34 may use the motion data to perform a motion compensation operation that generates a predicted picture associated with current picture (104). Next, residual picture construction module 38 may use the predicted picture generated by motion compensation module 34 and the original current picture to generate a residual picture associated with the current picture (106).

Forward transform module 30 may then generate a set of matrixes of transformed coefficients associated with the current picture (108). Forward transform module 30 may generate the set of matrixes of transformed coefficients associated with the current picture in a variety of ways depending on whether encoding module 12 is encoding the current picture as an intra-coded picture or as an inter-coded picture. For instance, if encoding module 12 is encoding the current picture as an intra-coded picture, forward transform module 30 may apply a forward DCT to each partition of the original current picture. If encoding module 12 is encoding the current picture as an inter-coded picture, forward transform module 30 may apply a forward DCT to each partition of the residual picture associated with the current picture.

After forward transform module 30 generates the matrixes of transformed coefficients associated with the current picture, quantization module 40 generates a set of matrixes of quantized coefficients associated with the current picture by quantizing the coefficients in the matrixes of transformed coefficients associated with the current picture (110). Entropy encoding module 42 may then perform an entropy encoding operation on the set of matrixes of quantized coefficients associated with the current picture and the set of motion data associated with the current picture (112). Next, inverse quantization module 44 generates a set of matrixes of inverse quantized coefficients associated with the current picture by inverse quantizing the quantized coefficients in the matrixes of quantized coefficients associated with the current picture (114). After generating the matrixes of inverse quantized coefficients, inverse transform module 46 generates matrixes of IDCT output values associated with the current picture by applying an IDCT to the inverse quantized coefficients in the matrixes of inverse quantized coefficients associated with the current picture (116).

After inverse transform module 46 generates the matrixes of IDCT output values, range detection module 50 may determine whether the current picture is the last picture associated with the set of video frames (118). If range detection module 50 determines that the current picture is not the last picture associated with the set of video frames ("NO" of 118), encoding module 12 may receive another picture associated with the set of video frames (100). Otherwise, if range detection module 50 determines that the current picture is the last picture associated with the set of video frames ("YES" of 118), range detection module 50 may calculate a maximum dynamic range of IDCT output values associated with the set of video frames (120). After range detection module 50 calculates the maximum dynamic range of IDCT output values associated with the set of video frames, object generation module 52 may generate a media object that includes the entropy encoded matrixes of quantized coefficients associated with the set of video frames, the entropy encoded sets of motion data associated with the set of video frames, and a range indication element that indicates the maximum dynamic range of IDCT output values associated with the set of video frames (122). Communications interface 14 may then output the media object (124).

Figure 5:
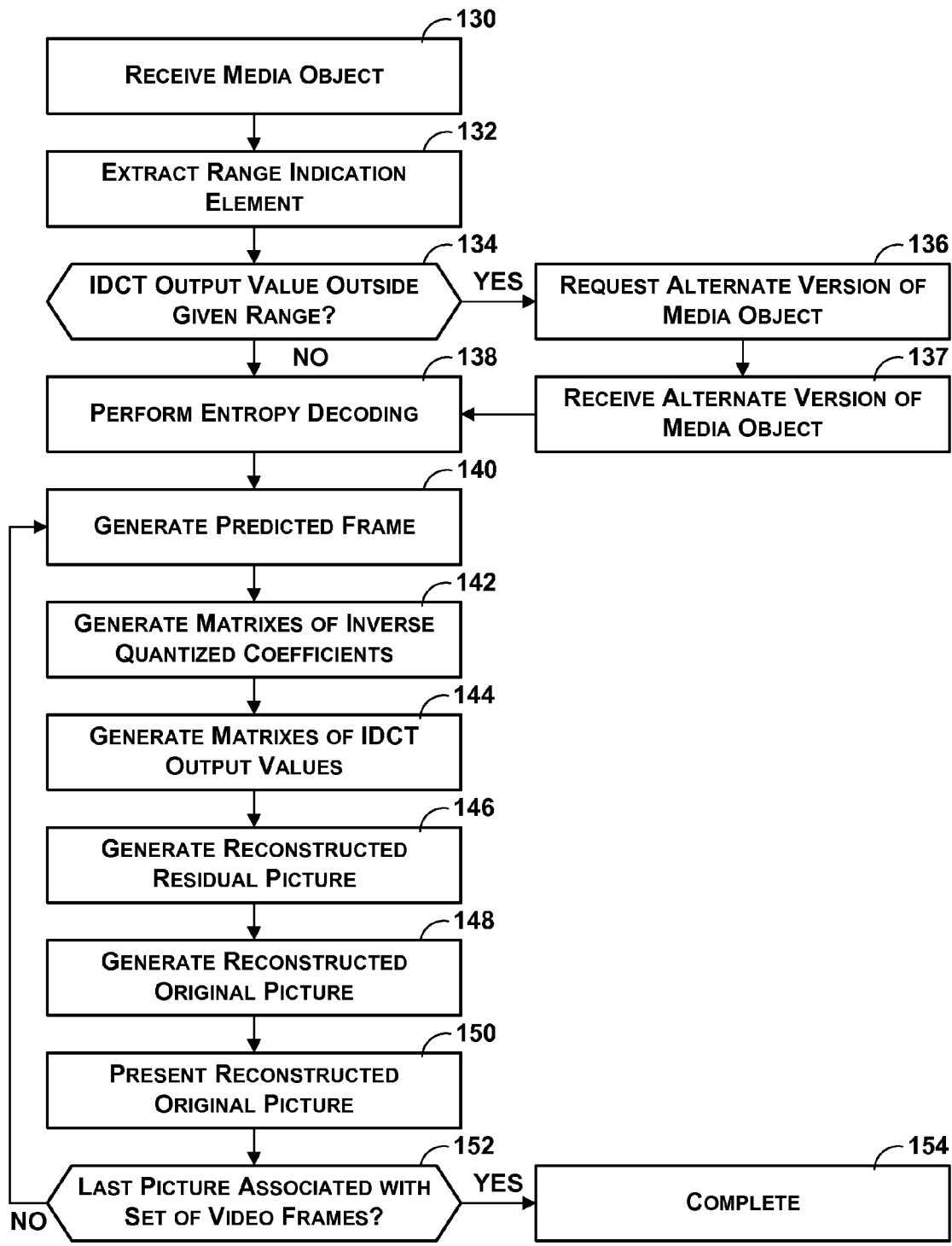
FIG. 5 is a flowchart illustrating an exemplary operation of the exemplary decoding module illustrated in FIG. 3.

FIG. 5 is a flowchart illustrating an exemplary operation of decoding module 18. Initially, decoding module 18 receives a media object that includes a set of encoded media data associated with a set of video frames, sets of encoded motion data associated with the set of video frames, and a range indication element (130). After decoding module 18 receives the media object, range checking module 72 extracts the range indication element from the media object (132). Range checking module 72 may then determine whether the range of IDCT output values indicated by the range indication element includes an IDCT output value that is outside a given range (134). For instance, range checking module 72 may determine whether the range of IDCT output values indicated by the range indication element is greater than the range of IDCT output values that primary inverse transform module 80 is capable of producing. If range checking module 72 determines that the range of IDCT output values indicated by the range indication element includes an IDCT output value that is outside the given range ("YES" of 134), range negotiation module 74 may, in one exemplary implementation, send a request for an alternate version of the media object to encoding device 4 (136). When range negotiation module 74 requests the alternate version of the media object, range negotiation module 74 may generate a range indication element that indicates the maximum dynamic range of IDCT output values that primary inverse transform module 80 is capable of producing. After sending the requesting for the alternate version of the media object, communications interface 16 may receive the alternate version of the media object (137).

On the other hand, if range checking module 72 determines that the range of IDCT output values indicated by the range indication element does not include an IDCT output value that is outside the given range ("NO" of 134), entropy decoding module 70 in decoding module 18 may perform an entropy decoding process on the set of encoded media data and the set of motion data in the media object (138). Entropy decoding module 70 may perform an entropy decoding process that is equivalent to the entropy encoding process used to encode the media data. For example, if entropy encoding module 42 uses Huffman encoding to encode the media data, entropy decoding module 70 uses Huffman decoding to decode the image. As a result of applying the entropy decoding process to each set of encoded media data, entropy decoding module 70 has produced a set of matrixes of quantized coefficients associated with pictures associated with video frames in the set of video frames.

After entropy decoding module 70 performs the entropy decoding operation on the motion data, motion compensation module 76 in decoding module 18 may use the motion data to perform a motion compensation operation, thereby generating a predicted picture associated with the current picture (140).

Subsequently or in parallel with motion compensation module 76, inverse quantization module 78 in decoding module 18 may generate a set of matrixes of inverse quantized coefficients associated with a current picture associated with the set of video frames by applying an inverse quantization operation to matrixes of quantized coefficients associated with the current picture (142). Inverse quantization module 78 may inverse quantize a matrix of quantized coefficients by multiplying the quantized coefficients by numbers associated with corresponding positions of the quantization matrix. For example, if a quantized coefficient at position (0,0) of a matrix of quantized coefficients is −26 and the number at position (0,0) of a quantization matrix is 16, the inverse quantized coefficient at position (0,0) of a matrix of inverse quantized coefficients is −416 (i.e., −26*16=−416). Notice in this example, the difference between the original coefficient of −415 (i.e., round(−415/16)=−26) and the resulting coefficient of −416. This difference is "quantization error."

After inverse quantization module 78 generates the matrixes of inverse quantized coefficients associated with the current picture, primary inverse transform module 80 generates a set of matrixes of IDCT output values associated with the current picture by applying an IDCT to the set of matrixes of inverse quantized coefficients (144). Next, residual reconstruction module 84 uses the set of matrixes of IDCT output values associated with the current picture to generate a reconstructed residual picture associated with the current picture (146). After residual reconstruction module 84 generates the reconstructed residual picture associated with the current picture, picture reconstruction module 86 uses the reconstructed residual picture and the predicted picture associated with the current picture to generate a reconstructed version of the current picture (148). Once picture reconstruction module 86 generates the reconstructed version of the current picture, presentation driver 22 may cause media presentation unit 24 to display the reconstructed version of the current picture (150).

If the current picture is not the last picture associated with the set of video frames ("YES" of 152), motion compensation module 76 perform a motion compensation operation on a picture associated with the set of video frames that follows the current picture, and so on (140). On the other hand, if the current picture is the last picture associated with the set of video frames ("NO" of 152), decoding module 18 has completed decoding the set of video frames (154).

Figure 6:
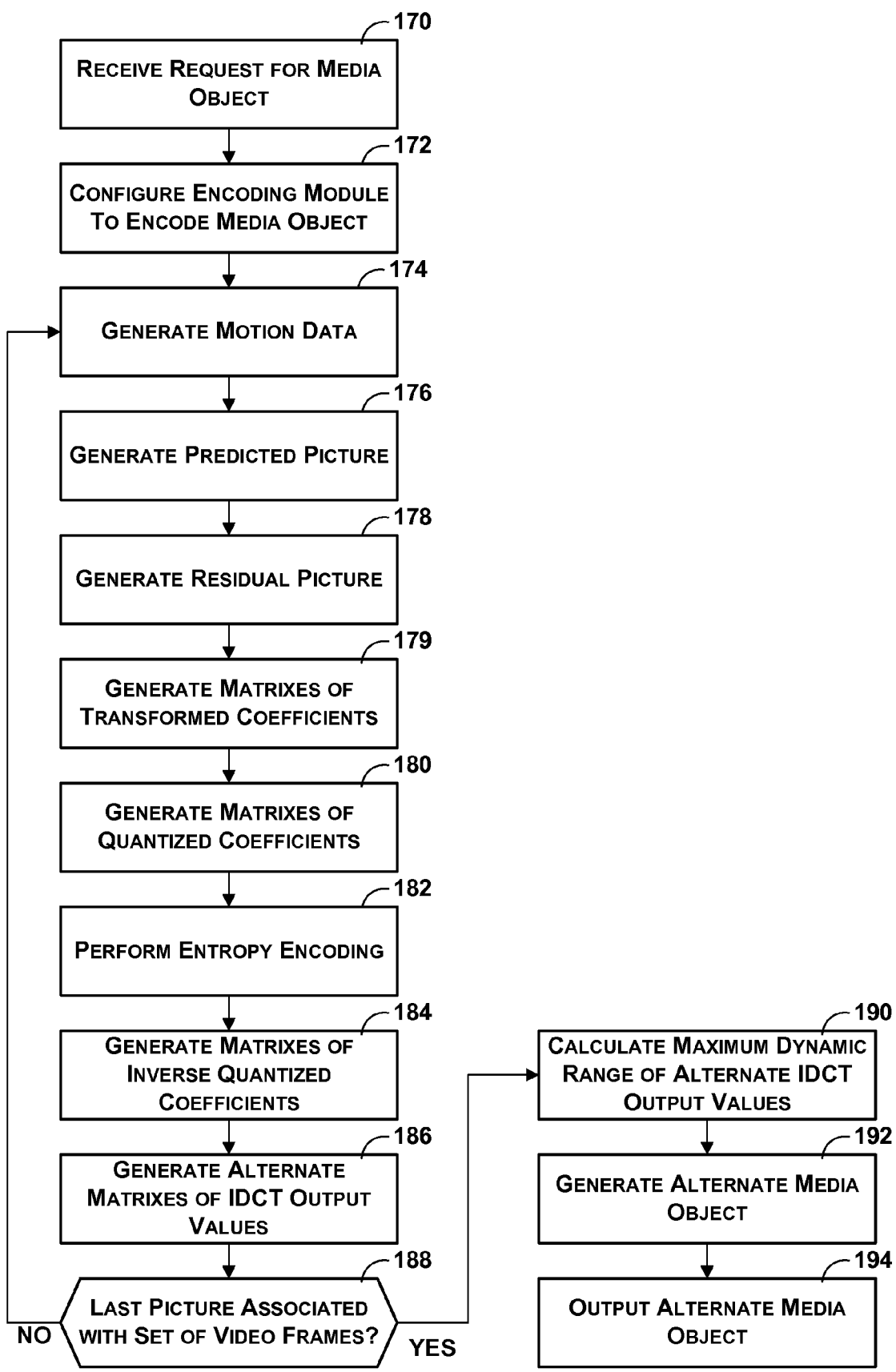
FIG. 6 is a flowchart illustrating an additional exemplary operation of the exemplary encoding module illustrated in FIG. 2.

FIG. 6 is a flowchart illustrating an additional exemplary operation of encoding module 12. Initially, communications interface 14 in encoding device 4 receives a request for a media object from decoding device 6 (170). Communications interface 14 may receive this request in conjunction with a range indication element that indicates a given range. For instance, communications interface 14 may receive a range indication element from decoding device 6 that indicates a maximum dynamic range of IDCT output values that a decoding module in decoding device 6 is capable of producing.

When communications interface 14 receives the request for the media object, range configuration module 54 may configure encoding module 12 to produce the requested media object (172). For instance, if communications interface 14 has received a range indication element from decoding device 6, range configuration module 54 may configure encoding module 12 to produce a media object in which IDCT output values associated with encoded media data in the media object do not fall outside the range indicated by the range indication element received from decoding device 6. As discussed above, range configuration module 54 may configure encoding module 12 in a variety of ways, including the configuration of quantization matrices used by quantization module 40 and inverse quantization module 44.

After range configuration module 54 configures encoding module 12, encoding module 12 may generate the requested media object. As illustrated in the example operation of FIG. 6, encoding module 12 may generate the requested media object by using motion estimation module 32 to generate motion data for a current picture associated with the set of video frames of the requested media object (174). Motion compensation module 34 may then generate a predicted picture associated with the current picture (176). Next, residual picture construction module 38 may use the predicted picture and the current picture to generate a residual picture associated with the current picture (178). After residual picture construction module 38 generates the residual picture, forward transform module 30 generates matrixes of transformed coefficients associated with the set of video frames at least in part by performing a forward discrete cosine transform on pixel component values in the residual pictures (179). Quantization module 40 may then generate a set of matrixes of quantized coefficients associated with the current picture (180). Quantization module 40 may generate the set of matrixes of quantized coefficients associated with the current picture by using a quantization matrix to quantize coefficients in the matrixes of transformed coefficients associated with the current picture that were previously generated by forward transform module 30. Entropy encoding module 42 may then perform an entropy encoding operation on the matrixes of quantized coefficients (182).

In addition, inverse quantization module 44 may generate a set of matrixes of inverse quantized coefficients associated with the current picture (184). Inverse transform module 46 may then generate a set of IDCT output values associated with the current picture by applying an IDCT to the set of matrixes of inverse quantized coefficients associated with the current picture (186).

After inverse transform module 46 generates the alternate set of matrixes of quantized coefficients associated with the current picture, range detection module 50 may determine whether the current picture is the last picture associated with the set of video frames (188). If the current picture is not the last picture associated with the set of video frames ("NO" of 188), quantization module 40 may generate motion data for another picture associated with the set of video frames in the requested media object, and so on (174). On the other hand, if the current picture is the last picture associated with the set of video frames ("YES" of 188), range detection module 50 may calculate the range of IDCT output values generated by inverse transform module 46 for the set of video frames (190). Object generation module 52 may then generate a media object that includes the entropy-encoded sets of quantized coefficients associated with the set of video frames, entropy-encoded sets of motion data associated with the set of video frames, and a range indication element that indicates the maximum dynamic range of the alternate sets of IDCT output values associated with the set of video frames (192). Subsequently, communications interface 14 may output the media object (194).

Figure 7:
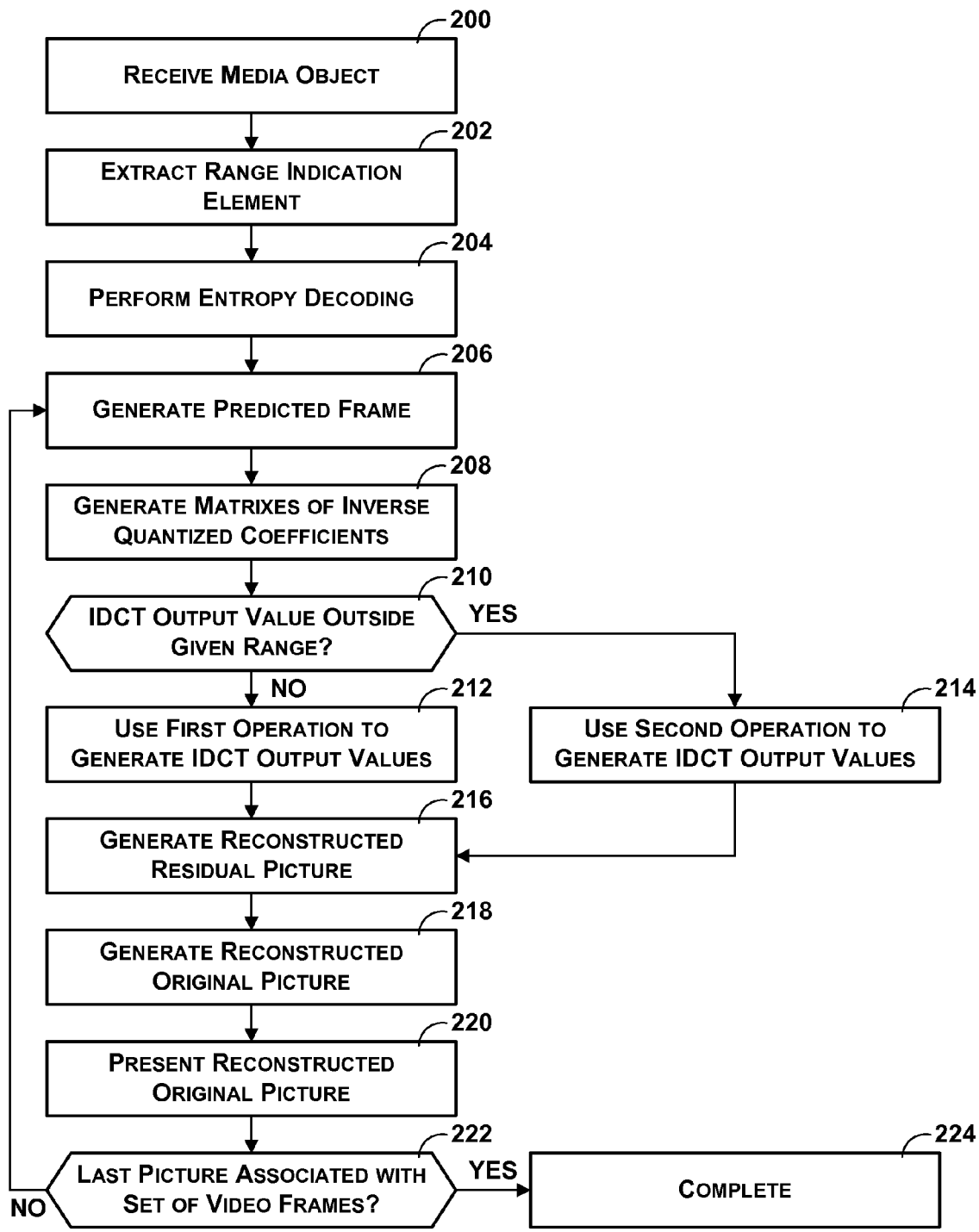
FIG. 7 is a flowchart illustrating an alternate exemplary operation of the exemplary decoding module illustrated in FIG. 3.

FIG. 7 is a flowchart illustrating an alternate exemplary operation of the exemplary decoding module illustrated in FIG. 3. Initially, decoding module 18 receives a media object that includes a set of encoded media data associated with a set of video frames, sets of encoded motion data associated with the set of video frames, and a range indication element (200). After decoding module 18 receives the media object, range checking module 72 extracts the range indication element from the media object (202). Next, entropy decoding module 70 in decoding module 18 may perform an entropy decoding process on the set of encoded media data and the set of motion data in the media object (204). Entropy decoding module 70 may perform an entropy decoding process that is equivalent to the entropy encoding process used to encode the media data. For example, if entropy encoding module 42 uses Huffman encoding to encode the media data, entropy decoding module 70 uses Huffman decoding to decode the image. As a result of applying the entropy decoding process to each set of encoded media data, entropy decoding module 70 has produced a set of matrixes of quantized coefficients associated with pictures associated with video frames in the set of video frames.

After entropy decoding module 70 performs the entropy decoding operation on the encoded media data and the motion data, motion compensation module 76 in decoding module 18 may use the motion data to perform a motion compensation operation, thereby generating a predicted picture associated with the current picture (206). Subsequently or in parallel with motion compensation module 76, inverse quantization module 78 in decoding module 18 may generate a set of matrixes of inverse quantized coefficients associated with a current picture associated with the set of video frames by applying an inverse quantization operation to matrixes of quantized coefficients associated with the current picture (208).

After inverse quantization module 78 generates the matrixes of inverse quantized coefficients associated with the current picture, range checking module 72 may determine whether the range of IDCT output values indicated by the range indication element includes an IDCT output value that is outside a given range (210). If range checking module 72 determines that the range of IDCT output values indicated by the range indication element does not include an IDCT output value that is outside the given range ("NO" of 210), primary inverse transform module 80 may use a first operation to generate a set of matrixes of IDCT output values associated with the current picture by applying an IDCT to the set of matrixes of inverse quantized coefficients (212). Otherwise, if range checking module 72 determines that the range of IDCT output values indicated by the range indication element includes an IDCT output value that is outside the given range ("YES" of 210), secondary inverse transform module 82 may use a second operation to generate a set of matrixes of IDCT output values associated with the current picture by applying an IDCT to the set of matrixes of inverse quantized coefficients (214).

After either primary inverse transform module 80 or secondary inverse transform module 82 generates the set of matrixes of IDCT output values, residual reconstruction module 84 uses the set of matrixes of IDCT output values associated with the current picture to generate a reconstructed residual picture associated with the current picture (216). After residual reconstruction module 84 generates the reconstructed residual picture associated with the current picture, picture reconstruction module 86 uses the reconstructed residual picture and the predicted picture associated with the current picture to generate a reconstructed version of the current picture (218). Once picture reconstruction module 86 generates the reconstructed version of the current picture, presentation driver 22 may cause media presentation unit 24 to display the reconstructed version of the current picture (220).

If the current picture is not the last picture associated with the set of video frames ("YES" of 222), motion compensation module 76 perform a motion compensation operation on a picture associated with the set of video frames that follows the current picture, and so on (206). On the other hand, if the current picture is the last picture associated with the set of video frames ("NO" of 222), decoding module 18 has completed decoding the set of video frames (224).

The techniques described herein may be implemented in hardware, software, firmware, or any combination thereof. Any features described as modules or components may be implemented together in an integrated circuit or an integrated logic device, or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

Various examples have been described. These and other examples are within the scope of the following claims.

The invention claimed is:
1. A method comprising:
    receiving, with a decoding module, a media object that includes encoded media data that represents a set of one or more video frames and a range indication element that indicates a maximum dynamic range of inverse discrete cosine transform ("IDCT") output values associated with the encoded media data;

determining whether the maximum dynamic range of IDCT output values associated with the encoded media data includes an IDCT output value that is outside a given range;

using a first operation to generate a set of IDCT output values based on the encoded media data when the maximum dynamic range of IDCT output values associated with the encoded media data does not include an IDCT output value that is outside the given range;

using the set of IDCT output values to generate reconstructed video frames associated with video frames in the set of video frames;

causing a media presentation unit to present the reconstructed video frames; and performing a second operation when the maximum dynamic range of IDCT output values associated with the encoded media data includes an IDCT output value that is outside the given range, the second operation being different than the first operation.

2. The method of claim 1, wherein performing the second operation comprises:

requesting an alternate media object when the maximum dynamic range of IDCT output values associated with the encoded media data includes an IDCT output value that is outside the given range; and receiving the alternate media object, wherein the alternate media object includes alternate encoded media data that represents the set of video frames, wherein a maximum dynamic range of IDCT output values associated with the alternate encoded media data does not include an IDCT output value that is outside the given range.

3. The method of claim 1, wherein performing the second operation comprises generating the set of IDCT output values based on the encoded media data when the maximum dynamic range of IDCT output values associated with the encoded media data includes an IDCT output value that is outside the given range.

4. The method of claim 1, wherein the method further comprises:

performing an entropy decoding operation on the encoded media data to generate a set of matrixes of quantized coefficients associated with the set of video frames; and generating matrixes of inverse quantized coefficients associated with the set of video frames at least in part by inverse quantizing quantized coefficients in the set of matrixes of quantized coefficients; and wherein using the first operation to generate the set of IDCT output values comprises generating the set of IDCT output values by applying an IDCT to the matrixes of inverse quantized coefficients.

5. The method of claim 1, wherein using the set of IDCT output values to generate reconstructed video frames comprises:

generating reconstructed residual pictures that include the IDCT output values;

generating predicted pictures associated with the set of video frames by performing a motion compensation operation using motion data associated with the set of video frames; and generating reconstructed pictures using the reconstructed residual pictures and the predicted pictures.

6. A device comprising:

a communications interface that receives a media object that includes encoded media data that represents a set of one or more video frames and a range indication element that indicates a maximum dynamic range of inverse discrete cosine transform ("IDCT") output values associated with the encoded media data;

a range checking module that determines whether the maximum dynamic range of IDCT output values associated with the encoded media data includes an IDCT output value that is outside a given range;

a first inverse transform module that uses a first operation to generate a set of IDCT output values based on the encoded media data when the maximum dynamic range of IDCT output values associated with the encoded media data does not include an IDCT output value that is outside the given range;

a picture reconstruction module that uses the set of IDCT output values to generate reconstructed video frames associated with video frames in the set of video frames; and a presentation driver that causes a media presentation unit to present the reconstructed video frames, wherein the range checking module performs a second operation when the maximum dynamic range of IDCT output values associated with the encoded media data includes an IDCT output value that is outside the given range, the second operation being different than the first operation.

7. The device of claim 6, further comprising:

a range negotiation module that requests an alternate media object when the maximum dynamic range of IDCT output values associated with the encoded media data includes an IDCT output value that is outside the given range; and wherein the communications interface receives the alternate media object, wherein the alternate media object includes alternate encoded media data that represents the set of video frames, wherein a maximum dynamic range of IDCT output values associated with the alternate encoded media data does not include an IDCT output value that is outside the given range.

8. The device of claim 6, further comprising a second inverse transform module that uses the second operation to generate the set of IDCT output values based on the encoded media data when the maximum dynamic range of IDCT output values associated with the encoded media data includes an IDCT output value that is outside the given range.

9. The device of claim 6, wherein the device further comprises:

an entropy decoding module that performs an entropy decoding operation on the encoded media data to generate a set of matrixes of quantized coefficients associated with the set of video frames; and an inverse quantization module that generates a set of inverse quantized coefficients associated with the set of video frames at least in part by inverse quantizing quantized coefficients in the set of matrixes of quantized coefficients; and wherein the first inverse transform module generates the set of IDCT output values by applying an IDCT to the set of matrixes of inverse quantized coefficients.

10. The device of claim 6,
wherein the device further comprises:
a residual reconstruction module that generates reconstructed residual pictures that include the IDCT output values; and
a motion compensation module that generates predicted pictures associated with the set of video frames by performing a motion compensation operation using motion data associated with the set of video frames; and
wherein the picture reconstruction module uses the reconstructed residual pictures and the predicted pictures to generate the reconstructed video frames.

11. The device of claim 6, wherein the communications interface is a wireless communication interface.

12. A method comprising:
receiving, from a decoding device, a message that indicates a maximum dynamic range of inverse discrete cosine transform ("IDCT") output values;
generating, in response to receiving the message, a first set of encoded media data that represents a set of one or more video frames, wherein IDCT output values associated with the first set of encoded media data do not include an IDCT output value that is outside the indicated maximum dynamic range of IDCT output values; and
outputting the first set of encoded media data to the decoding device.

13. The method of claim 12, wherein the method further comprises:
generating a second set of encoded media data that represents the set of video frames;
calculating a maximum dynamic range of IDCT output values associated with the second set of encoded media data;
generating a media object that includes the second set of encoded media data and a range indication element that indicates the maximum dynamic range of IDCT output values associated with the second set of encoded media data; and
outputting the media object to the decoding device.

14. The method of claim 12, wherein generating the first set of encoded media data comprises:
generating residual pictures associated with video frames in the set of video frames;
generating matrixes of transformed coefficients associated with the set of video frames at least in part by performing a forward discrete cosine transform on pixel component values in the residual pictures;
generating matrixes of quantized coefficients associated with the set of video frames at least in part by quantizing transformed coefficients in the matrixes of transformed coefficients; and
performing an entropy encoding operation on the matrixes of quantized coefficients, thereby creating the first set of encoded media data.

15. The method of claim 12,
wherein the method further comprises receiving a request from the decoding device for a media object that includes the set of video frames; and
wherein receiving the message comprises receiving the message in conjunction with the request.

16. A device comprising:
a communications interface that receives, from a decoding device, a message that indicates a maximum dynamic range of inverse discrete cosine transform ("IDCT") output values;
an encoding module that generates, in response to receiving the message, a first set of encoded media data that represents a set of one or more video frames, wherein IDCT output values associated with the first set of encoded media data do not include an IDCT output value that is outside the indicated maximum dynamic range of IDCT output values; and
wherein the communications interface outputs the first set of encoded media data to the decoding device.

17. The device of claim 16,
wherein the encoding module generates a second set of encoded media data that represents the set of video frames;
wherein the encoding module comprises:
a range detection module that calculates a maximum dynamic range of IDCT output values associated with the second set of encoded media data;
an object generation module that generates a media object that includes the second set of encoded media data and a range indication element that indicates the maximum dynamic range of IDCT output values associated with the second set of encoded media data; and
wherein the communications interface outputs the media object to the decoding device.

18. The device of claim 17, wherein the message is received from the decoding device when the decoding device determines that the maximum dynamic range of IDCT output values associated with the second set of encoded media data includes a value that is outside the maximum dynamic range indicated in the message.

19. The device of claim 16, wherein the encoding module comprises:
a residual picture construction module that generates residual pictures associated with video frames in the set of video frames;
a forward transform module that generates matrixes of transformed coefficients associated with the set of video frames at least in part by performing a forward discrete cosine transform on pixel component values in the residual pictures;
a quantization module that generates matrixes of quantized coefficients associated with the set of video frames at least in part by quantizing coefficients in the matrixes of transformed coefficients; and
an entropy encoding module that performs an entropy encoding operation on the matrixes of quantized coefficients, thereby creating the first set of encoded media data.

20. The device of claim 16, wherein the communications interface receives a request from the decoding device for a media object that includes the set of video frames, wherein the communications interface receives the message in conjunction with the request.

21. A system comprising:
an encoding device; and
a decoding device;
wherein the decoding device comprises:
a first communications interface that receives from the encoding device a media object that includes a first set of encoded media data that represents a set of one or more video frames and a range indication element that indicates a maximum dynamic range of inverse discrete cosine transform ("IDCT") output values associated with the first set of encoded media data;
a range checking module that determines whether the maximum dynamic range of IDCT output values associated with the first set of encoded media data includes an IDCT output value that is outside a given range;

a range negotiation module that causes the first communication interface to output to the encoding device a message that indicates the maximum dynamic range of IDCT output values when the maximum dynamic range of IDCT output values associated with the encoded media data includes an IDCT output value that is outside the given range;

a first inverse transform module that uses a first operation to generate a set of IDCT output values based on the first set of encoded media data when the maximum dynamic range of IDCT output values associated with the first set of encoded media data does not include an IDCT output value that is outside the given range;

a picture reconstruction module that uses the set of IDCT output values to generate reconstructed video frames associated with video frames in the set of video frames; and a presentation driver that causes a media presentation unit to present the reconstructed video frames; and wherein the encoding device comprises:

a second communications interface that receives, from the decoding device, the message that indicates the given range;

an encoding module that generates, in response to receiving the message, a second set of encoded media data that represents the set of one or more video frames, wherein IDCT output values associated with the second set of encoded media data do not include an IDCT output value that is outside the given range; and wherein the second communications interface outputs the second set of encoded media data to the decoding device.

22. The system of claim 21, wherein the encoding module comprises:

a range detection module that calculates a maximum dynamic range of IDCT output values associated with the second set of encoded media data;

an object generation module that generates a second media object that includes the second set of encoded media data and a second range indication element that indicates the maximum dynamic range of IDCT output values associated with the second set of encoded media data; and wherein the second communications interface outputs the media object to the decoding device.

23. The system of claim 21, wherein the encoding module further comprises:

a residual picture construction module that generates residual pictures associated with video frames in the set of video frames;

a forward transform module that generates matrixes of transformed coefficients associated with the set of video frames at least in part by performing a forward discrete cosine transform on pixel component values in the residual pictures;

a quantization module that generates matrixes of quantized coefficients associated with the set of video frames at least in part by quantizing coefficients in the matrixes of transformed coefficients; and an entropy encoding module that performs an entropy encoding operation on the matrixes of quantized coefficients, thereby creating the second set of encoded media data.

24. The system of claim 21, wherein the decoding device further comprises:

an entropy decoding module that performs an entropy decoding operation on the first set of encoded media data to generate a set of matrixes of quantized coefficients associated with the set of video frames; and an inverse quantization module that generates a set of inverse quantized coefficients associated with the set of video frames at least in part by inverse quantizing quantized coefficients in the set of matrixes of quantized coefficients; and wherein the first inverse transform module generates the set of IDCT output values by applying an IDCT to the set of matrixes of inverse quantized coefficients.

25. The system of claim 21, wherein the decoding device further comprises a second inverse transform module that uses a second operation to generate the set of IDCT output values based on the first set of encoded media data when the maximum dynamic range of IDCT output values associated with the first set of encoded media data includes an IDCT output value that is outside the given range.

\* \* \* \* \*